US008936874B2

(12) United States Patent
Shi et al.

(10) Patent No.: US 8,936,874 B2
(45) Date of Patent: Jan. 20, 2015

(54) CONDUCTIVE NANOCOMPOSITE-BASED ELECTRODES FOR LITHIUM BATTERIES

(75) Inventors: Jinjun Shi, Columbus, OH (US); Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 12/156,644

(22) Filed: Jun. 4, 2008

(65) Prior Publication Data
US 2009/0305135 A1 Dec. 10, 2009

(51) Int. Cl.
| H01M 4/58 | (2010.01) |
| H01M 4/02 | (2006.01) |
| H01M 4/36 | (2006.01) |
| H01M 4/62 | (2006.01) |
| H01M 4/42 | (2006.01) |
| H01M 4/44 | (2006.01) |
| H01M 4/48 | (2010.01) |
| H01M 4/13 | (2010.01) |
| B82Y 30/00 | (2011.01) |
| H01M 4/131 | (2010.01) |
| H01M 4/136 | (2010.01) |

(52) U.S. Cl.
CPC .............. H01M 4/13 (2013.01); B82Y 30/00 (2013.01); H01M 4/625 (2013.01); H01M 4/131 (2013.01); H01M 4/136 (2013.01); H01M 2004/025 (2013.01); Y02E 60/122 (2013.01)
USPC ............. 429/231.8; 429/217; 429/218.1; 429/221; 429/222; 429/223; 429/224; 429/226; 429/228; 429/229; 429/231

(58) Field of Classification Search
CPC .... Y02E 60/122; H01M 4/133; H01M 4/587; H01M 4/621; H01M 4/38; H01M 4/386; H01M 4/387
USPC ............. 429/100–300, 209, 218.1, 222, 225, 429/231, 231.8
See application file for complete search history.

(56) References Cited

U.S. PATENT DOCUMENTS

| 5,635,151 | A | 6/1997 | Zhang et al. |
| 5,908,715 | A | 6/1999 | Liu et al. |
| 6,007,945 | A | 12/1999 | Jacobs et al. |
| 6,143,448 | A | 11/2000 | Fauteux et al. |
| 6,316,143 | B1 | 11/2001 | Foster et al. |
| 6,398,125 | B1 | 6/2002 | Liu et al. |
| 6,524,744 | B1 | 2/2003 | Clerc et al. |
| 6,623,559 | B2 | 9/2003 | Huang |
| 6,858,318 | B2 | 2/2005 | Kogiso et al. |
| 6,872,330 | B2 | 3/2005 | Mack et al. |
| 7,094,499 | B1 | 8/2006 | Hung |
| 2006/0049101 | A1 | 3/2006 | Suib et al. |
| 2006/0216603 | A1 | 9/2006 | Choi |
| 2006/0237697 | A1 | 10/2006 | Kosuzu et al. |
| 2006/0263689 | A1 | 11/2006 | Ishihara et al. |
| 2007/0020519 | A1 | 1/2007 | Kim et al. |
| 2007/0031730 | A1 | 2/2007 | Kawakami et al. |
| 2007/0099081 | A1* | 5/2007 | Matsuda et al. ............... 429/217 |
| 2007/0122701 | A1 | 5/2007 | Yamaguchi |
| 2007/0148544 | A1 | 6/2007 | Le |
| 2008/0160411 | A1* | 7/2008 | Chiang et al. ............... 429/221 |
| 2008/0261112 | A1* | 10/2008 | Nagata et al. ............... 429/218.1 |
| 2008/0261116 | A1* | 10/2008 | Burton et al. ............... 429/231.8 |

OTHER PUBLICATIONS

Ng et al., "Highly Reversible Lithium Storage in Spheroidal Carbon-Coated Silicon Nanocomposites as Anodes for Lithium-Ion Batteries", Angew. Chem. Int. Ed. 2006, 45, 6896-6899.*
Novoselov et al. "Electric Field Effect in Atomically Thin Carbon Films", Science, vol. 306. No. 5696, pp. 666-669, 2004.*
Ulyashin et al. "The influence of the amorphous silicon deposition temperature on the efficiency of the ITOγA-Si:HγC-Si heterojunction (HJ) solar cells and properties of interfaces", Thin Solid Films 403-404 (2002) 359-362.*
U.S. Appl. No. 11/509,424, filed Aug. 25, 2006, B. Z. Jang, et al.
C. K. Chan, et al., "High-Performance Lithium Battery Anodes Using Silicon Nanowires," Nature Nanotechnology, published online Dec. 16, 2007, 5 pages.
R. S. Wagner and W.C. Ellis, "Vapor-liquid-solid mechanism of single crystal growth," Appl. Phys Letter, 4 (1964) pp. 89-90.
K. Kolasinski, "Catalytic growth of nanowires," Current Opinion in Solid State and Materials Science, 10 (2006) pp. 182-191.
F. D. Wang, A.G. Dong, J.W. Sun, R. Tang, H. Yu and W.E. Buhro, "Solution-liquid-solid growth of semiconductor nanowires," Inorg Chem., 45 (2006) pp. 7511-7521.
W. C. West, et al., "Electrodeposited Amorphous Manganese Oxide Nanowire Arrays for High Energy and Power Density Electrodes," J. Power Source, 126 (2004) 203-206.
S. Ohara, et al., "Li Insertion/Extraction Reaction at a Si Film Evaporated on a Ni Foil," J. Power Source, 119-121 (2003) 591-596.
T. Takamura, et al., "A Vacuum Deposited Si Film Having a Li Extraction Capacity Over 2000 mAh/g with a Long Cycle Life," J. Power Source, 129 (2004) 96-100.
M. Uehara, et al., "Thick Vacuum Deposited Silicon Films Suitable for the Anode of Li-ion Battery," J. Power Source, 146 (2005) 441-444.

*Primary Examiner* — Ladan Mohaddes
(74) *Attorney, Agent, or Firm* — Mark Levy Thompson Hine

(57) ABSTRACT

This invention provides a nanocomposite-based lithium battery electrode comprising: (a) A porous aggregate of electrically conductive nano-filaments that are substantially interconnected, intersected, physically contacted, or chemically bonded to form a three-dimensional network of electron-conducting paths, wherein the nano-filaments have a diameter or thickness less than 1 μm (preferably less than 500 nm); and (b) Sub-micron or nanometer-scale electro-active particles that are bonded to a surface of the nano-filaments with a conductive binder material, wherein the particles comprise an electro-active material capable of absorbing and desorbing lithium ions and wherein the electro-active material content is no less than 25% by weight based on the total weight of the particles, the binder material, and the filaments. Preferably, these electro-active particles are coated with a thin carbon layer. This electrode can be an anode or a cathode. The battery featuring such an anode or cathode exhibits an exceptionally high specific capacity, an excellent reversible capacity, and a long cycle life.

18 Claims, 15 Drawing Sheets

(56) References Cited

OTHER PUBLICATIONS

S. Ohara, et al., "A Thin Film Silicon Anode for Li-ion Batteries Having a very Large Specific Capacity and a Long Cycle Life," J. Power Source, 136 (2004) 303-306.

J. Niu, et, "Improvement of Usable Capacity and Cyclability of Silicon-Based Anode Materials," Electrochemical and Solid-State Letters, 5(6) (2002) A107-A110.

T. L. Kulova, et al., "Lithium Insertion into Amorphous Silicon Thin-Film Electrodes," J. Electroanalytical Chemistry, 600 (2007) 217-225.

S. Bourderau, et al., "Amorphous Silicon as a Possible Anode Material for Li-ion Batteries," J. Power Source, 81-82 (1999) 233-236.

K. L. Lee, et al., "Electrochemical Characteristics of a-Si Thin Film Anode for Li-ion Rechargeable Batteries," J. Power Source, 129 (2004) 270-274.

H. J. Jung, et al., "Amorphous Silicon Anode for Lithium-Ion Rechargeable Batteries," J. Power Source, 115 (2003) 346-351.

Umeno, et al., "Novel Anode Material for Lithium-Ion Batteries: Carbon-coated Silicon Prepared by Thermal Vapor Decomposition," Chemistry Letters, (2001) pp. 1186-1187.

M. Yoshio, et al., "Carbon-Coated Si as a Lithium-Ion Battery Anode Material," J. of the Electrochem. Soc., 149 (12) (2002) A1598-A1603.

N. Dimov, et al., "Characterization of Carbon-Coated Silicon Structural Evolution and Possible Limitations," J. Power Source, 114 (2003) 88-95.

E. C. Walter, et al., "Electrodeposition of Portable Metal Nanowire Arrays," in Physical Chemistry of the Interfaces and Nanomaterials, Eds. J. Zhang, Proc. SPIE 2002, 9 pages.

N. Dimov, et al., "Carbon-coated Silicon as Anode Material for Lithium Ion Batteries: Advantages and Limitations," Electrochimica Acta, 48 (2003) 1579-1587.

Z. S. Wen, et al., "High Capacity Silicon/Carbon Composite Anode Materials for Lithium Ion Batteries," Electrochemistry Communications, 5 (2003) 165-168.

J. M. Deitzel, et al, "The Effect of Processing Variables on the Morphology of Electro-spun Nano-fibers and Textiles," Polymer, 42 (2001) pp. 261-272.

A. F. Spivak, Y.A. Dzenis and D.H. Reneker, "A Model of Steady State Jet in the Electro-spinning Process," Mech. Res. Commun. 27 (2000) pp. 37-42.

I. D. Norris, et al., "Electrostatic Fabrication of Ultrafine Conducting Fibers: Polyaniline/Polyethylene oxide Blends," Synthetic Metals, 114 (2000) 109-114.

\* cited by examiner

CONDUCTIVE NANOCOMPOSITE-BASED ELECTRODES FOR LITHIUM BATTERIES

FIELD OF THE INVENTION

The present invention provides a nanocomposite-based anode and/or cathode in a lithium-ion battery, or a cathode in a lithium metal battery.

BACKGROUND

The following list of references is closely related to the prior art of lithium ion battery electrodes:

REFERENCES

1. J. Zhang, et al., "Carbon Electrode Materials for Lithium Battery Cells and Method of Making Same," U.S. Pat. No. 5,635,151 (Jun. 3, 1997).
2. Q. Liu, et al., "Composite Carbon Materials for Lithium Ion Batteries, and Method of Producing Same," U.S. Pat. No. 5,908,715 (Jun. 1, 1999).
3. J. K. Jacobs, et al, U.S. Pat. No. 6,007,945 (Dec. 28, 1999).
4. D. G. Fauteux, et al., U.S. Pat. No. 6,143,448 (Nov. 7, 2000).
5. C. C. Hung, "Carbon Materials Metal/Metal Oxide Nanoparticle Composite and Battery Anode Composed of the Same, U.S. Pat. No. 7,094,499 (Aug. 22, 2006).
6. D. Clerc, et al., "Multiphase Material and Electrodes Made Therefrom," U.S. Pat. No. 6,524,744 (Feb. 25, 2003).
7. D. L. Foster, et al, "Electrode for Rechargeable Lithium-Ion Battery and Method for Fabrication," U.S. Pat. No. 6,316,143 (Nov. 13, 2001).
8. D. B. Le, "Silicon-Containing Alloys Useful as Electrodes for Lithium-Ion Batteries," US 2007/0148544 (Pub. Jun. 28, 2007).
9. H. Yamaguchi, "Anode Material, Anode and Battery," US 2007/0122701 (Pub. May 31, 2007).
10. S. Kawakami, et al., "Electrode Material for Anode of Rechargeable Lithium Battery," US 2007/0031730 (Pub. Feb. 8, 2007).
11. H. Kim, et al., "Anode Active Material, Manufacturing Method Thereof, and Lithium Battery Using the Anode Active Material," US 2007/0020519 (Pub. Jan. 25, 2007).
12. H. Ishihara, "Anode Active Material and Battery," US 2006/0263689 (Pub. Nov. 23, 2006).
13. T. Kosuzu, et al., "Electrode Material for Rechargeable Lithium Battery," US 2006/0237697 (Pub. Oct. 26, 2006).
14. T. Umeno, et al., "Novel Anode Material for Lithium-Ion Batteries: Carbon-coated Silicon Prepared by Thermal Vapor Decomposition," Chemistry Letters, (2001) pp. 1186-1187.
15. M. Yoshio, et al., "Carbon-Coated Si as a Lithium-Ion Battery Anode Material," J. of the Electrochem. Soc., 149 (12) (2002) A1598-A1603.
16. N. Dimov, et al., "Characterization of Carbon-Coated Silicon Structural Evolution and Possible Limitations," J. Power Source, 114 (2003) 88-95.
17. N. Dimov, et al., "Carbon-coated Silicon as Anode Material for Lithium Ion Batteries: Advantages and Limitations," Electrochimica Acta, 48 (2003) 1579-1587.
18. Z. S. Wen, et al., "High Capacity Silicon/Carbon Composite Anode Materials for Lithium Ion Batteries," Electrochemistry Communications, 5 (2003) 165-168.
19. C. K. Chan, et al., "High-Performance Lithium Battery Anodes Using Silicon Nanowires," Nature Nanotechnology, published online 16 Dec. 2007, 5 pages.
20. Aruna Zhamu and Bor Z. Jang, "Hybrid Anode Compositions for Lithium Ion Batteries," U.S. patent application Ser. No. 11/982,662 (Nov. 5, 2007).
21. Aruna Zhamu and Bor Z. Jang, "Nano Graphene Platelet-Based Composite Anode Compositions for Lithium Ion Batteries," U.S. patent application Ser. No. 11/982,672 (Nov. 5, 2007).
22. Aruna Zhamu and Bor Z. Jang, "Hybrid Nano Filament Anode Compositions for Lithium Ion Batteries," U.S. patent application Ser. No. 12/006,209 (Jan. 2, 2008).
23. Aruna Zhamu and Bor Z. Jang, "Hybrid Nano Filament Cathode Compositions for Lithium Ion and Lithium Metal Batteries," U.S. patent application Ser. No. 12/009,259 (Jan. 18, 2008).
24. W. C. West, et al., "Electrodeposited Amorphous Manganese Oxide Nanowire Arrays for High Energy and Power Density Electrodes," J. Power Source, 126 (2004) 203-206.
25. S. L. Suib, et al., "Manganese Nanowires, Films, and Membranes and Methods of Making," US 2006/0049101 (Mar. 9, 2006).
26. S. H. Choi, "Lithium-Ion Rechargeable Battery Based on Nanostructures," US 2006/0216603 (Sep. 28, 2006).
27. J. J. Mack, et al., "Chemical Manufacture of Nanostructured Materials," U.S. Pat. No. 6,872,330 (Mar. 29, 2005).
28. Bor Z. Jang, Aruna Zhamu, and Jiusheng Guo, "Process for Producing Nano-scaled Platelets and Nanocomposites," U.S. patent application Ser. No. 11/509,424 (Aug. 25, 2006).
29. R. S. Wagner and W. C. Ellis, "Vapor-liquid-solid mechanism of single crystal growth," Appl. Phys Letter, 4 (1964) pp. 89-90.
30. K. W. Kolasinski, "Catalytic growth of nanowires: Vapor-liquid-solid, vapor-solid-solid, solution-liquid-solid and solid-liquid-solid growth," Current Opinion in Solid State and Materials Science, 10 (2006) pp. 182-191.
31. F. D. Wang, A. G. Dong, J. W. Sun, R. Tang, H. Yu and W. E. Buhro, "Solution-liquid-solid growth of semiconductor nanowires," Inorg Chem., 45 (2006) pp. 7511-7521.
32. E. C. Walter, et al., "Electrodeposition of Portable Metal Nanowire Arrays," in Physical Chemistry of Interfaces and Nanomaterials, Eds. Jin Z. Zhang and Zhong L. Wang, Proc. SPIE 2002, 9 pages.
33. M. Kogiso and T. Shimizu, "Metal Nanowire and Process for Producing the Same," U.S. Pat. No. 6,858,318 (Feb. 22, 2005).
34. J. M. Deitzel, J. Kleinmeyer, D. Harris and N. C. Beck Tan, "The Effect of Processing Variables on the Morphology of Electro-spun Nano-fibers and Textiles," Polymer, 42 (2001) pp. 261-272.
35. A. F. Spivak, Y. A. Dzenis and D. H. Reneker, "A Model of Steady State Jet in the Electro-spinning Process," Mech. Res. Commun. 27 (2000) pp. 37-42.
36.1. D. Norris, et al., "Electrostatic Fabrication of Ultrafine Conducting Fibers: Polyaniline/Polyethylene oxide Blends," Synthetic Metals, 114 (2000) 109-114.
37. W. C. Huang, "Method for the Production of Semiconductor Quantum Particles," U.S. Pat. No. 6,623,559 (Sep. 23, 2003).
38. J. H. Liu and B. Z. Jang, "Process and Apparatus for the Production of Nano-Scaled Powders," U.S. Pat. No. 6,398,125 (Jun. 4, 2002).
39. S. Ohara, et al., "Li Insertion/Extraction Reaction at a Si Film Evaporated on a Ni Foil," J. Power Source, 119-121 (2003) 591-596.
40. T. Takamura, et al., "A Vacuum Deposited Si Film Having a Li Extraction Capacity Over 2000 mAh/g with a Long Cycle Life," J. Power Source, 129 (2004) 96-100.

41. M. Uehara, et al., "Thick Vacuum Deposited Silicon Films Suitable for the Anode of Li-ion Battery," J. Power Source, 146 (2005) 441-444.
42. S. Ohara, et al., "A Thin Film Silicon Anode for Li-ion Batteries Having a very Large Specific Capacity and a Long Cycle Life," J. Power Source, 136 (2004) 303-306.
43. J. Niu and J. Y. Lee, "Improvement of Usable Capacity and Cyclability of Silicon-Based Anode Materials for Lithium Batteries by Sol-Gel Graphite Matrix," Electrochemical and Solid-State Letters, 5(6) (2002) A107-A110.
44. T. L. Kulova, et al., "Lithium Insertion into Amorphous Silicon Thin-Film Electrodes," J. Electroanalytical Chemistry, 600 (2007) 217-225.
45. S. Bourderau, et al., "Amorphous Silicon as a Possible Anode Material for Li-ion Batteries," J. Power Source, 81-82 (1999) 233-236.
46. K. L. Lee, et al., "Electrochemical Characteristics of a-Si Thin Film Anode for Li-ion Rechargeable Batteries," J. Power Source, 129 (2004) 270-274.
47. H. J. Jung, et al., "Amorphous Silicon Anode for Lithium-Ion Rechargeable Batteries," J. Power Source, 115 (2003) 346-351.

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g [Ref. 1].

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, for the anodes composed of these materials, pulverization (fragmentation of the alloy particles or fracturing of current collector-supported thin films) proceeds with the progress of the charging and discharging cycles due to expansion and contraction of the anode during the insertion and extraction of lithium ions. The expansion and contraction result in loss of particle-to-particle contacts or contacts between the anode material and its current collector. These adverse effects result in a significantly shortened charge-discharge cycle life.

To overcome the problems associated with such mechanical degradation, several approaches have been proposed [e.g., Refs. 2-18], including (a) using nano-scaled particles of an anode active material, (b) composites composed of small electrochemically active particles supported by less active or non-active matrices or coatings, and (c) metal alloying. Examples of active particles are Si, Sn, and $SnO_2$. For instance, Umeno, Yoshio, Dimove, and co-workers [Ref. 14-17] proposed an anode based on carbon-coated silicon prepared by thermal vapor decomposition. Although a specific capacity as high as 800-1,450 mAh/g was achieved, the capacity faded rapidly after 40 cycles. Hung [5] disclosed a method of forming a composite anode material. The steps include selecting a carbon material as a constituent part of the composite, chemically treating the selected carbon material to receive nanoparticles, incorporating nanoparticles into the chemically treated carbon material, and removing surface nanoparticles from an outside surface of the carbon material with incorporated nanoparticles. A material making up the nanoparticles alloys with lithium. The resulting carbon/nanoparticle composite anodes did not exhibit any significant increase in capacity, mostly lower than 400 mAh/g. In fact, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

It may be further noted that the cathode materials used in the prior art Li ion batteries are not without issues. As a matter of fact, a practical specific capacity of a cathode material has been, at the most, up to 200 mAh/g of the cathode material, which rapidly decays as the charge-discharge cycling operation proceeds. The positive electrode (cathode) active material is typically selected from a broad array of lithium-containing or lithium-accommodating oxides, such as manganese dioxide, manganese composite oxide, nickel oxide, cobalt oxide, nickel cobalt oxide, iron oxide, vanadium oxide, and iron phosphate. The cathode active material may also be selected from chalcogen compounds, such as titanium disulfate or molybdenum disulfate. These prior art materials do not offer a high lithium insertion capacity and this capacity also tends to decay rapidly upon repeated charging and discharging. In many cases, this capacity fading may be ascribed to particle or thin film pulverization (analogous to the case of an anode material), resulting in a loss of electrical contact of the cathode active material particles with the cathode current collector.

Furthermore, in most of the prior art electrodes (anodes or cathodes), a significant amount of a conductive material, such as acetylene black (AB), carbon black (CB), or ultra-fine graphite particles, must be used to improve the electrical connection between the electrode active material (typically in a fine powder form) and a current collector (e.g., Al or Cu foil). Additionally, a binder is normally required to bond the constituent particles of both the electrode active material and the conductive additive for forming an integral electrode body. The binder is typically selected from, for instance, polytetrafluoroethylene (PTFE), polyvinylidene fluoride (PVDF), ethylene-propylene-diene copolymer (EPDM), or styrene-butadiene rubber (SBR), which are electrically non-conductive. A typical mixing ratio of these ingredients is 60% to 85% by weight for the electrode active material, 5% to 30% by weight for the conductive additive, and approximately 5% to 10% by weight for the binder. This implies that the cathode typically contains a significant proportion of non-electro-active materials (up to 40%) that do not contribute to the absorption and extraction of Li ions, leading to a low specific capacity.

Therefore, a need exists for an electrode active material that has a high specific capacity, a minimal irreversible capacity (or a low decay rate), and a long cycle life. In order to accomplish these goals, we have worked intensively on the development of new electrode materials. As a result of these research and development efforts, several new and distinctly different electrode platform technologies have been discovered, as summarized in several earlier applications [Refs. 20-23]:

Ref. [20] provides an exfoliated graphite-based hybrid material composition for use as an electrode. The composition comprises: (a) micron- or nanometer-scaled particles or coating which are capable of absorbing and desorbing alkali or alkaline metal ions (particularly, lithium ions); and (b) exfoliated graphite flakes that are substantially interconnected to form a porous, conductive graphite network comprising pores (commonly referred to as graphite worms), wherein at least one of the particles or coating resides in a pore of the network or attached to a flake of the network. These graphite worms are obtained from heat-induced expansion of intercalated graphite particles and are characterized as having naturally interconnected (un-separated) graphite flakes.

Ref. [21] provides a nano-scaled graphene platelet-based composite material composition for use as an electrode. The composition comprises: (a) micron- or nanometer-scaled particles or coating which are capable of absorbing and desorbing lithium ions; and (b) a plurality of nano-scaled graphene platelets (NGPs), wherein at least one of the particles or coating is physically attached or chemically bonded to at least one of the graphene platelets. An NGP is a platelet composed of a graphene sheet or a stack of graphene sheets having a platelet thickness less than 100 nm. NGPs can be obtained from graphite worms by mechanically or chemically separating those interconnected flakes.

Ref. [22] provides a hybrid nano-filament anode composition, comprising: (a) an aggregate of nanometer-scaled, electrically conductive filaments that are substantially interconnected, intersected, or percolated to form a porous, electrically conductive filament network comprising substantially interconnected pores, wherein the filaments have an elongate dimension and a first transverse dimension with the first transverse dimension being less than 500 nm (preferably less than 100 nm) and an aspect ratio of the elongate dimension to the first transverse dimension greater than 10; and (b) micron- or nanometer-scaled coating that is deposited on a surface of the filaments, wherein the coating comprises an anode active material capable of absorbing and desorbing lithium ions and the coating has a thickness less than 20 µm (preferably less than 1 µm).

Ref. [23] provides a hybrid nano-filament cathode composition, comprising (a) an aggregate of nanometer-scaled, electrically conductive filaments that are substantially interconnected, intersected, or percolated to form a porous, electrically conductive filament network, wherein the filaments have a length and a diameter or thickness with the diameter or thickness being less than 500 nm; and (b) micron- or nanometer-scaled coating that is deposited on a surface of the filaments, wherein the coating comprises a cathode active material capable of absorbing and desorbing lithium ions and the coating has a thickness less than 10 µm, preferably less than 1 µm and more preferably less than 500 nm.

The present invention provides yet another platform electrode technology that is patently distinct from the aforementioned electrode materials [Refs. 20-23] in the following manners:

(a) The presently invented electrodes are based on conductive nano filaments that form a three-dimensional (3D) network of electron-conducting paths. An electro-active material (e.g., Si for an anode and lithium cobalt oxide for a cathode) in an ultra-fine particle form (<1 µm in diameter) is bonded to the exterior surface of the nano filaments using a conductive binder material (e.g., a carbonized resin). Although the anode and cathode materials in [Ref. 22] and [Ref. 23], respectively, were also based on a 3D network of conductive filaments, the electro-active materials in both cases existed in the form of a thin coating film deposited on the exterior surface of a filament.

(b) Although nano particles were used in the anode structure of [Ref. 21], NGPs were used passively as a conductive additive (in place of conventional conductive additives, such as carbon black and fine graphite powder), not as a supporting substrate. It was not specified in [Ref. 21] that NGPs must form a 3D network of interconnected filaments. Rather, NGPs in [Ref. 21] were typically bonded by a non-conductive binder, such as poly (vinylidine fluoride) (PVDF) and styrene-butadine rubber (SBR). Although presumably NGPs in [Ref. 21] could reach a condition of percolation, the primary function of the NGPs used in [Ref. 21] was to protect anode active particles by cushioning the stresses or strains of anode particles (e.g., Si particles) induced by their volume expansion/contraction. The high strength and flexibility (large length-to-thickness ratio) of NGPs were the desired properties for this purpose. In this case, the length and width of an NGP were comparable in size (with a length-to-width ratio typically less than 1.5).

(c) Further, [Ref. 21] was limited to NGPs only and [Ref. 20] was limited to graphite worms or exfoliated graphite only. In contrast, the presently invented electrode is based on nano filaments such as electro-spun nano fibers, carbonized electro-spun nano fibers, vapor-grown carbon or graphite nano fibers, carbon or graphite whiskers, carbon nano-tubes, nano-scaled graphene platelets with a length-to-width ratio greater than 3 (to facilitate the formation of a 3D network), metal nano wires, metal-coated nano wires, carbon-coated nano wires, metal-coated nano fibers, carbon-coated nano fibers, and combinations thereof. If NGPs are used as the primary constituent nano-filaments in the present invention, these NGPs must have a length-to-width ratio greater than 3 for the purpose of readily forming an integral web structure to support nano particles thereon and provide a 3D network of electron-conducting paths. Of course, in addition to other types of nano-filaments such as nano-fibers, regular NGPs with a length-to-width ratio less than 3 (typically between 1 and 2, as in [Ref. 21]) may be incorporated as part of the conductive web of the present invention.

(d) Both [Ref. 20] and [Ref. 21] were used for the anode only, but the present invention can be applied to the preparation of either an anode or a cathode.

(e) We have surprisingly discovered that the electro-active nano particles can be well-bonded to the 3D web of NGPs (with a high length-to-width ratio) and/or other nano filaments (e.g., carbonized electro-spun nano-fibers) using a conductive binder (e.g., a carbonized resin). Although the electro-active particles underwent large-scale expansions and shrinkages, the 3D web and the binder were surprisingly capable of holding on the nano particles and maintaining electron path continuity for an extended cycle life. Such a configuration is easy to obtain, making the presently invented technology amenable for scale-up. No slower process such as chemical vapor deposition of coating is required. Our experimental results clearly demonstrate that NGPs with a high length-to-width ratio (l/w>3) make a more effective and stable web compared with regular NGPs (typically with l/w<1.5).

SUMMARY OF THE INVENTION

This invention provides a nanocomposite-based lithium battery electrode comprising: (a) A porous aggregate (web) of electrically conductive nano-filaments that are substantially interconnected, intersected, physically contacted, or chemically bonded to form a three-dimensional network of electron-conducting paths, wherein the nano-filaments have a diameter or thickness less than 1 μm (preferably <500 nm); and (b) Sub-micron or nanometer-scale electro-active particles (having a diameter <1 μm, preferably <500 nm, and most preferably <100 nm) that are bonded to a surface of the nano-filaments with a conductive binder material, wherein the particles comprise an electro-active material (e.g., Si) capable of absorbing and desorbing lithium ions and wherein the electro-active material content is no less than 20% by weight based on the total weight of the particles, the binder, and the filaments. Further preferably, these electro-active particles are coated with a thin carbon layer. This electrode can be an anode or a cathode, depending upon the electro-active material involved. The battery featuring such an anode or cathode exhibits an exceptionally high specific capacity, an excellent reversible capacity, and a long cycle life.

The conductive nano-filament is characterized by having an elongate axis (length or largest dimension) and a first transverse dimension (smallest dimension, such as a thickness of a nano graphene platelet or a diameter of a nano-wire, nano-tube, or nano-fiber) wherein the thickness or diameter is smaller than 1 μm (preferably smaller than 500 nm). Preferably, the length-to-diameter or length-to-thickness aspect ratio is no less than 10 (typically much higher than 100). The filament may have a cross-sectional area that is not spherical. In this case, the diameter is taken as the average of the major axis (largest dimension in a cross-section) and the minor axis (smallest dimension).

The nano-filaments may comprise an electrically conductive material selected from the group consisting of electro-spun nano fibers, carbonized electro-spun nano fibers, vapor-grown carbon or graphite nano fibers, carbon or graphite whiskers, carbon nano-tubes, nano-scaled graphene platelets with a length-to-width ratio greater than 3 (typically with a length-to-thickness ratio much greater than 100), metal nano wires, metal-coated nano wires, carbon-coated nano wires, metal-coated nano fibers, carbon-coated nano fibers, and combinations thereof.

Preferably, multiple conductive filaments are processed to form an aggregate or web, characterized in that these filaments are intersected, overlapped, bonded, or somehow interconnected to one another to form a network of electron-conducting paths, which are electrically connected to a current collector. Preferably, the web is formed prior to bonding the electro-active particles to the web of nano filaments. In a preferred embodiment of the present invention, these conductive nano filaments are bonded together with a conductive binder material to form the web structure. This binder can be the same binder material used to bond the electrode active material particles to the conductive nano filaments. Again, this conductive network of filaments may be formed before the step when nano particles of an electro-active material are bonded onto the exterior surface of the filaments using the conductive binder. However, it is possible that the formation of a network of conductive filaments and the particle bonding step occur concurrently.

The electro-active material may be an anode active material, such as silicon and tin, or a cathode active material, such as lithium manganese oxide, lithium cobalt oxide, lithium nickel oxide, lithium vanadium oxide, and lithium transition metal phosphate (e.g., lithium iron phosphate and lithium iron-manganese phosphate, etc). The aggregate or web has substantially interconnected pores that are intended for accommodating the electrolyte in a battery.

The electro-active particles, having a diameter less than 1 μm (preferably less than 0.5 μm and most preferably less than 100 nm), are bonded on the exterior surface of conductive nano-filaments using a conductive binder. These nano particles preferably cover a significant portion (preferably a majority of the exterior surface) of the substrate nano-filaments so that the electro-active nano particle content is at least 20% by weight based on the total weight of particles and filaments (preferably at least 50% and most preferably at least 70% by weight). The substrate nano-filaments may be selected from a variety of materials.

The conductive binder material may be selected from a conductive polymer, a polymeric carbon, an amorphous carbon, a metal or metal alloy, or a combination thereof. Preferably, the conductive binder material is obtained from carbonization of poly(acrylonitrile), poly(furfuryl alcohol), poly (amic acid), polyimide, phenolic resin, or a combination thereof. Further preferably, the electro-active particles are coated with a thin layer of carbon having a thickness less than 1 μm (preferably thinner than 100 nm). Typically, this thin carbon layer can be readily or naturally formed when the binder is based on carbonization of a resin.

The web- or aggregate-forming process may be carried out continuously or intermittently, preferably on a reel-to-reel (roll-to-roll) basis. The porous aggregate may be in the form of a web, non-woven, or paper-like sheet structure. In one preferred embodiment, the porous structure, having two primary surfaces, may have the first primary surface exposed to a nano particle-containing slurry, enabling conductive nano-filaments to be bonded with nano particles of an electro-active material. Then, the porous structure may have the second primary surface exposed to a matrix material, enabling the impregnation of the porous structure with a resin, metal melt, or carbon from the second primary surface to form a conductive composite layer, which serves as a current collector. The resulting two-layer structure is an integrated electrode-current collector.

Hence, such an integrated structure may be made with the following steps: (a) Providing a porous aggregate, web, non-woven, or paper-like sheet structure comprising electrically conductive nano-filaments that are substantially interconnected, intersected, physically contacted, or chemically bonded to form a porous network of electrically conductive filaments, wherein the nano-wires have a diameter or thickness less than 1 μm and the porous aggregate, web, non-woven, or paper-like sheet structure has opposing first and second primary surfaces; (b) Depositing an electro-active material (in the form of fine particles) onto a surface of the nano-filaments from the first primary surface of the porous structure, wherein the electro-active coating is capable of absorbing and desorbing lithium ions and the particles have a diameter less than 1 μm; and (c) Impregnating the porous aggregate, web, non-woven, or paper-like sheet structure from the second primary surface with a matrix material to form a conductive current collector composite layer. The matrix material in step (c) may be selected from a polymer, metal, or carbon material.

The cathode active material particles may be selected from, as examples, lithium manganese oxide, lithium cobalt oxide, lithium nickel oxide, lithium vanadium oxide, or a mixture thereof. These oxides may be doped with one or more elements selected from Li, Na, K, Al, Mg, Cr, Ni, Mn, Cu, Sn, Zn, other transition metals, or rare earth metals. Dopants are used primarily to stabilize the phase or crystal structure during repeated cycles of charging and discharging. Other cathode active materials that can be made into fine particles may also be used for practicing the present invention. These include lithium iron phosphate, lithium manganese-iron phosphate, other lithium-containing transition metal phosphates, transition metal sulfides, etc. Such a cathode may be used in either a lithium metal battery or lithium ion battery. The corresponding anode active material may comprise a lithium metal or lithium alloy (e.g., in a thin foil form) if the battery is a lithium metal battery.

For a lithium ion battery (whether or not using the presently invented cathode), the anode active material in a fine particle form, according to a preferred embodiment of the present invention, may be selected from the following groups of materials:

(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 µm, more preferably thinner than 1 µm, and most preferably thinner than 100 nm;

(b) The alloys or intermetallic compounds of Si, Ge, Sn, Pb, Sb, Bi, Zn, Al, or Cd, stoichiometric or non-stoichiometric with other elements; and (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

The aforementioned electrode active materials, either cathode or anode active materials, when used alone as an electrode active material in a particulate form (particles bonded by a resin binder and mixed with a conductive additive, such as carbon black) or thin film form (directly coated on a copper- or aluminum-based current collector), have been commonly found to suffer from the fragmentation (pulverization) problem and poor cycling stability. By contrast, when fine particles of an electrode active material are bonded, with a conductive binder, to the exterior surface of multiple conductive filaments that form an interconnected hybrid nano-filament web, the resulting electrode surprisingly exhibits a high reversible capacity, a low irreversible capacity loss, long cycle life, low internal resistance, and fast charge-recharge rates. Quite surprisingly, the integrity of the fine particle bonded filament structures was well-maintained over a large number of discharge-charge cycles.

In the conventional Li-ion battery electrodes (e.g., schematically shown in FIG. 1(A)), although conductive additives (such as carbon black and fine graphite particles) could also form a condition of percolation where the particles contact one another to form a network of conductive paths, they do so with a much higher conductive additive content due to their unfavorable geometric form factor (more or less spherical with an aspect ratio of approximately 1). Furthermore, in these conventional electrodes, the chains of particles that form the network of electron-conducting paths are easily broken when the electro-active particles expand or shrink during the Li ion insertion or extraction steps.

Compared with the prior art Li battery electrodes, the presently invented nanocomposite electrode platform technology has several major advantages, summarized as follows:

(1) During lithium insertion and extraction, the fine particles expand and shrink. The geometry of the binder and the underlying filament (e.g., thin-diameter nano-filaments) enables the supported particles to freely undergo strain relaxation in transverse directions (e.g., in a radial direction). Surprisingly, although the electro-active material is not in a thin coating form (as in [Refs. 22 and 23]), the bonded fine particles are still chemically and thermo-mechanically compatible with the nano filaments and the conductive binder materials (conductive polymer or polymeric carbon), to the extent that the particles do not loss contact with its underlying substrate filament and binder upon repeated charge/discharge cycling operations. Further, it seems that the aggregate or web of filaments, being mechanically strong and tough, are capable of accommodating or cushioning the strains or stresses imposed on the filaments without fracturing. This feature serves to maintain a network of electron-conducting paths that are electronically connected to a current collector for a long cycle life.

(2) With the active material particle diameter less than 1 µm (most preferably less than 100 nm), the distance that lithium ions have to travel is short. The electrode can quickly store or release lithium and, hence, the battery can be discharged or re-charged rapidly. This is a highly beneficial feature for a battery that is intended for electric vehicle applications, where a fast discharge rate capability (e.g., during acceleration) is required. In all battery applications, a fast re-charge rate is clearly a highly desirable feature. A driver can quickly recharge a car battery in a matter of 10 to 60 minutes instead of several hours.

(3) The presently invented hybrid nano filament-based electrode platform technology is applicable to both the anode and cathode configuration and can be used to prepare electrodes from a broad array of anode and cathode active materials.

(4) The interconnected network of filaments (schematically shown in FIG. 2(A) or FIG. 2(B)) forms a continuous path for electrons, resulting in significantly reduced internal energy loss or internal heating. The electrons that are produced at the anode or those that reach the cathode active material particles only have to travel along a radial direction to a short distance r (which is the radius of an electro-active particle, typically <500 nm) through a large cross-sectional area A, which is approximately equal to half of the total exterior surface of a sphere ($A=2\pi r^2$). This implies a low resistance according to the well-known relation between the resistance $R_1$ of a physical object and the intrinsic resistivity $\rho$ of the material making up the object: $R_1 = \rho(t/A) = \rho r/(2\pi r^2) = (3\ \Omega cm)/(6.28 \times 100\ nm \times 10^{-7}\ cm/nm) = 4.77 \times 10^4\ \Omega$. In this calculation we have assumed r=100 nm. Once the electrons move from the anode-active particle into the underlying filament, which is highly conductive, they will rapidly travel down the filament longitudinal axis (of length L') and be collected by a current collector, which is made to be in good electronic contact with the web or individual filaments ($\rho_f = 10^{-4}\ \Omega cm$, a typical value for graphitized nano-fibers). The resistance along this highly conductive filament (average travel distance=½L') is relatively low, $R_2 = ½\rho'(L'/A'') = ½\ 10^{-4}\ \Omega cm \times 10 \times 10^{-4}\ cm/[0.785 \times 10^{-10}\ cm^2] = 6.37 \times 10^2\ \Omega$. The total resistance=$R_1+R_2=4.83\times 10^4\ \Omega$.

This is in sharp contrast to the situation as proposed by West, et al. [24], Suib, et al. [25], and Choi, et al. [26], where the cathode active material was in the form of parallel nanowires that were end-connected to a cathode current collector plate, as schematically shown in FIG. 1(B). Chan, et al [Ref.

19] proposed a similar approach for an anode active material, where multiple Si nanowires were catalytically grown from an anode current collector surface in a substantially perpendicular direction. The later case [Ref. 19] is herein used as an example to illustrate the drawbacks of prior art end-connected nanowire-based electrodes as proposed in [Refs. 19, 24-26]. Referring to FIG. 1(B) again, the electrons produced by the Si nanowires (diameter=89 nm) in an anode must travel through a narrow cross-sectional area A' of a nanowire of length l. The resistance to electron transport along the nanowire is given approximately by $R=\rho(\frac{1}{2}l/A')$, with an average travel distance of half of the nanowire length (hence the factor, ½). Based on the data provided by Chan, et al., $\rho=3$ Ωcm (after first cycle), $A'=(\pi d^2/4)=19.8\times10^{-12}$ cm$^2$, and l=10 μm, we have $R=\frac{1}{2}\times 3$ Ωcm×10×10$^{-4}$ cm/(19.8×10$^{-12}$ cm$^2$)=7.5× 10$^7$Ω, which is almost 3 orders of magnitude higher than that of a particle bonded filament as herein invented. The electrical conductivities of cathode active materials (e.g., cobalt oxide and lithium iron phosphate) are lower than that of Si (e.g., resistivity of lithium iron phosphate=10$^8$ to 10$^9$ Ωcm), making the situation even worse for the case of nanowires as cathode active materials.

(5) In the end-connected nanowire technology of Chan, et al. [Ref. 19], each Si nanowire is only connected to a current collector through a very narrow contact area (diameter=89 nm) and, hence, the nanowire would tend to detach from the steel current collector after a few volume expansion-contraction cycles. This is also true of the end-connected nanowire-based cathode cases [24-26]. Furthermore, if fragmentation of a nanowire occurs, only the segment in direct contact with the current collector (e.g., steel plate in Chan, et al.) could remain in electronic connection with the current collector and all other segments will become ineffective since the electrons generated will not be utilized. In contrast, in the instant invention, the electro-active nano particles are bonded around a filament with a strong conductive binder material and, surprisingly, the electro-active particles appear to be capable of remaining in physical contact with the underlying binder or filament, which is essentially part of the current collector, during multiple charge-discharge operations.

(6) For anode active materials, the present technology provides an anode active material that can reach a specific capacity of >3,200 mAh/g, eight (8) times higher than that of the theoretical capacity (372 mAh/g) of a graphite-based anode active material.

These and other advantages and features of the present invention will become more transparent with the description of the following best mode practice and illustrative examples.

DETAILED DESCRIPTION OF PREFERRED EMBODIMENTS

Figure 1A:
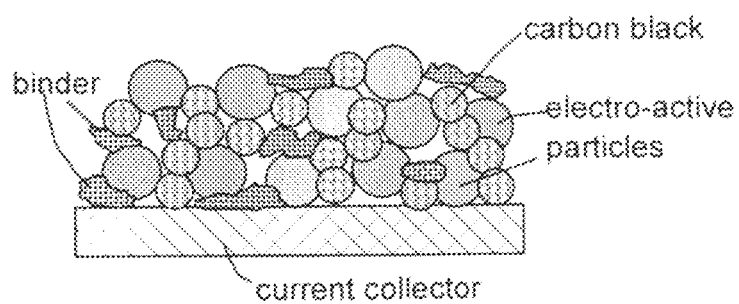
FIG. 1 (A) Schematic of a prior art electrode where electro-active particles, conductive additive particles (e.g., carbon black or fine graphite powder), and a binder material are randomly mixed together; and (B) Schematic of a prior art anode composition composed of Si nanowires catalytically grown in a direction normal to a steel current collector according to Chan, et al. [Ref. 19] (similar situations were proposed for cathodes [Refs. 24-26]

As used herein, "nanoscopic-scale," "nanoscopic," "nanometer-scale," "nanoscale," the "nano-" prefix, and the like generally refers to a physical object having a width, thickness, or diameter of less than about 1 μm, preferably <500 nm, and more preferably <100 nm. In all embodiments, the filament has a largest dimension (length) and a smallest dimension (diameter or thickness). In a filament with non-circular or non-elliptic cross-section, there can be a width and a thickness. For instance, a nano filament may have a rectangular cross-section having a width and a thickness (the smaller of the two being the thickness). For an elliptic cross-section or any irregular cross-section, there is a largest dimension (major axis) and a smallest dimension (minor axis). In each case, if the term "diameter" is used, it is intended to refer to the effective diameter, as defined by the average of the major and minor axis of the cross-section of the filament.

A class of nano filaments of interest to the present invention is the nanoscopic wire, also herein referred to as the nanoscopic-scale wire, nanoscale wire, or nanowire. At any point along its length, a nanowire has at least one cross-sectional dimension and, in some embodiments, two orthogonal cross-sectional dimensions less than about 1 μm, preferably less than about 500 nm, and most preferably less than about 100 nm. Where nanoscale wires are described as having a core and an outer region, the above dimensions generally relate to those of the core. The cross-section of a nanoscale wire may have any arbitrary shape, including, but not limited to, circular, square, rectangular, tubular, or elliptical, and may have an irregular shape. For example, ZnO nanowires have a hexagonal cross-section, $SnO_2$ nanowires have a rectangular cross-section, PbSe nanowires have a square cross-section, and Si or Ge nanowires have a circular cross-section. Again, the term "diameter" is intended to refer to the average of the major and minor axis of the cross-section. The nanoscale wire may be solid or hollow. The length of the nanoscale wire is preferably at least 1 μm and more preferably at least 5 μm. The wires should have an aspect ratio (length to diameter) of at least about 3:1, preferably greater than about 10:1, and more preferably greater than about 100:1.

As used herein, a nanotube (e.g. a carbon nanotube) is generally a nanoscopic wire that is hollow, or that has a hollowed-out core, including those nanotubes known to those of ordinary skill in the art. Nanotube is abbreviated herein as NT. Nanotubes and nano rods may be considered as two special classes of small wires for use in the invention. However, vapor-grown carbon nanotubes (CNTs) and vapor-grown carbon nano-fibers (VG-CNFs) may be treated as a second preferred class of nano filaments in the present invention. Also, in the instant application, for the purpose of defining the scope of the claims, both the polymer nano-fibers obtained via electro-spinning or other techniques and "polymer nanowires" obtained by template-assisted synthesis are included as another class of preferred nano filaments.

This invention is related to anode or cathode materials for high-capacity lithium batteries, which are preferably secondary batteries based on a non-aqueous electrolyte or a polymer gel electrolyte. The shape of a lithium metal or lithium ion battery can be cylindrical, square, button-like, etc. The present invention is not limited to any battery shape or configuration.

Figure 3:
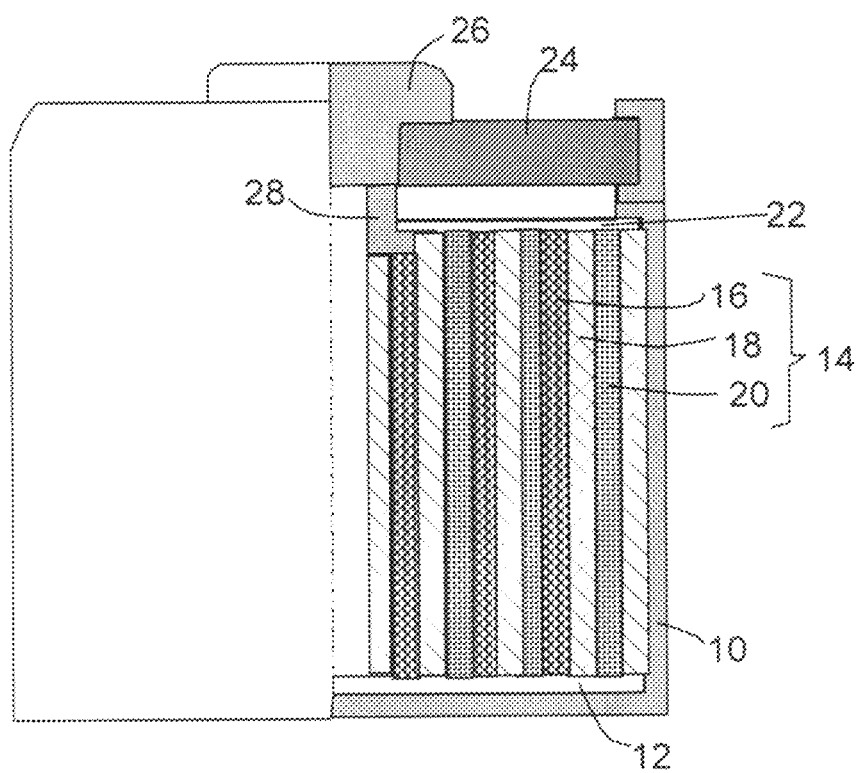
FIG. 3 Schematic of a cylinder-shape lithium ion battery.

As an example, a cylindrical battery configuration is shown in FIG. 3. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

Preferred embodiments of the present inventions are now herein described. We choose to begin the description of the invention with a discussion on the cathode materials and processes. However, it is important to point out that the presently invented method is applicable to both cathode and anode materials. Conventional positive electrode (cathode) active materials are well-known in the art. Typically, the conventional positive electrode 16 can be manufactured by the steps of (a) mixing a positive electrode active material in a powder form with a conductive additive (conductivity-promoting ingredient) and a binder, (b) dispersing the resultant mixture in a suitable solvent, (c) coating the resulting suspension on a collector, and (d) removing the solvent from the suspension to form a thin plate-like electrode. The positive electrode active material may be selected from a wide variety of oxides, such as lithium-containing nickel oxide, lithium-containing cobalt oxide, lithium-containing nickel-cobalt oxide, lithium-containing vanadium oxide, lithium iron phosphate, lithium manganese phosphate, lithium manganese-iron phosphate, and other lithium metal (or mixed metals) phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a relatively high cell voltage and relatively good cycling stability.

In the conventional cathode, acetylene black (AB), carbon black (CB), or ultra-fine graphite particles are used as a conductive additive. The binder is typically chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. Preferable mixing ratio of these ingredients may be 80 to 95% by weight for the positive electrode active material, 3 to 20% by weight for the conductive additive, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

In the prior art, conventional cathode active materials in the form of either fine particles or thin films (that are directly coated on a current collector) tend to have a low reversible specific capacity and a short cycle life due to several reasons. One primary reason is the notion that these structures tend to be crystalline and have a limited theoretical capacity. Another reason is that the particles or films tend to fracture (get pulverized or fragmented) upon charge-discharge cycling and, hence, lose contact with the cathode current collector. In order to overcome these and other drawbacks of prior art cathode materials, we have developed a new class of cathode active materials that are based on a nano filament composite approach.

In one preferred embodiment, the present invention provides a nano-filament composite-based cathode composition.

Figure 2A:
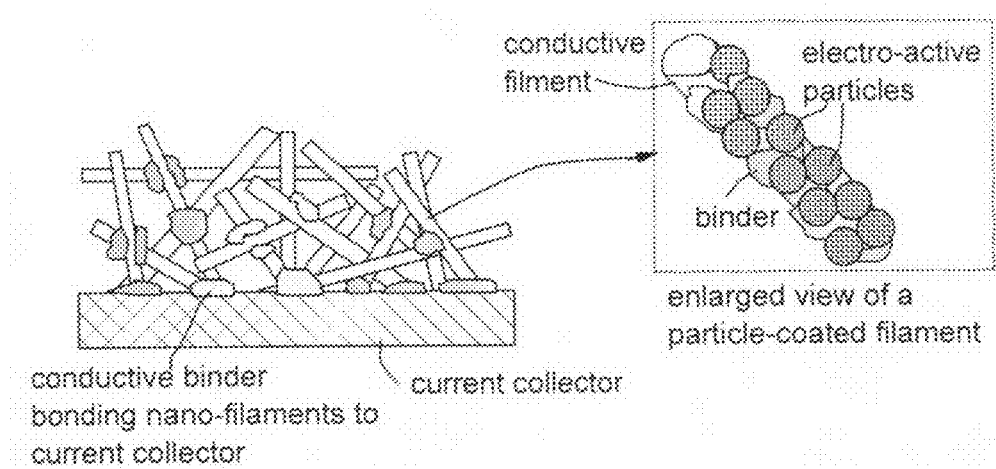
FIG. 2 (A) Schematic of an electrode comprising electro-active material particles bonded onto nano-filaments with a conductive binder material wherein the filaments are electrically conductive and form a three-dimensional network of electron-conducting paths and wherein the filaments are bonded to a current collector with a conductive binder material; and (B) Similar to the hybrid nano-filament electrode in (A), but the conductive filaments are slightly embedded in or integrated with a current collector.
Figure 2B:
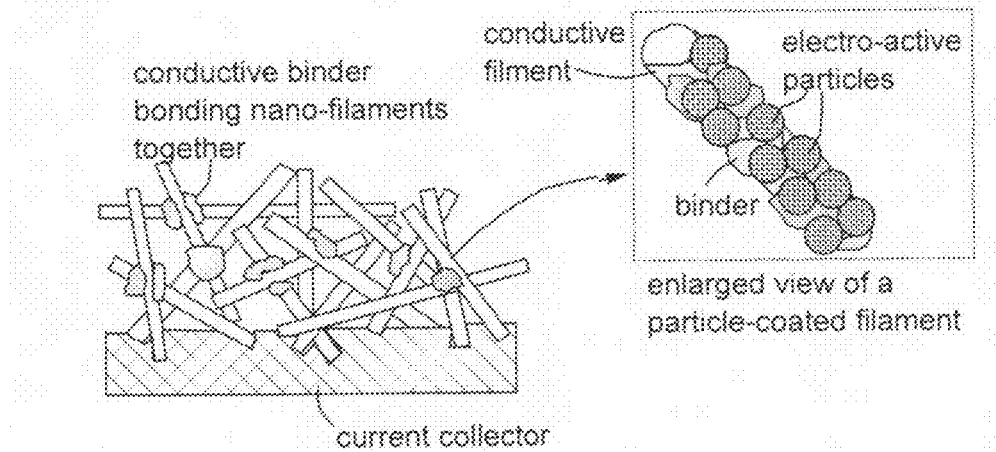

Referring to FIG. 2(A) and FIG. 2(B), the composition comprises (a) an aggregate or web of electrically conductive nano-filaments that are substantially interconnected, intersected, or bonded to form a porous, electrically conductive filament network, wherein the filaments have an elongate dimension (length) and a transverse dimension (diameter or thickness) with the diameter or thickness being less than 1 μm (preferably <500 nm and most preferably less than 100 nm); and (b) submicron- or nanometer-scaled particles that are bonded on a surface of the filaments by using a conductive binder material, wherein the particles comprise a cathode active material capable of absorbing and desorbing lithium ions and the particles have a diameter less than 1 μm, preferably less than 500 nm, and most preferably less than 100 nm. The aggregate or web has substantially interconnected pores that are intended for accommodating the electrolyte in a battery. The electro-active particles preferably occupy a weight fraction of at least 20% based on the total weight of filaments, binder, and particles. The weight fraction of electro-active particles is preferably greater than 50% and more preferably greater than 70%.

The cathode active material may be selected from a wide variety of oxides, such as lithium-containing nickel oxide, cobalt oxide, nickel-cobalt oxide, vanadium oxide, and lithium iron phosphate. These oxides may contain a dopant, which is typically a metal element or several metal elements. The cathode active material may also be selected from chalcogen compounds, such as titanium disulfate, molybdenum disulfate, and metal sulfides. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese phosphate, lithium manganese-iron phosphate, lithium vanadium phosphate, and the like. These cathode active materials can be readily bonded onto the surface of conductive filaments using an electrically conductive binder material, such as an intrinsically conductive polymer, a polymeric carbon (a pyrolyzed or carbonized polymer), an amorphous carbon obtained by chemical vapor deposition, a metal, or a combination thereof.

Preferably, multiple conductive nano-filaments, intended for supporting cathode active material particles, are processed to form an aggregate or web, characterized in that these nano-filaments are intersected, overlapped, or somehow bonded (e.g., using a conductive binder) to one another to form a network of electron-conducting paths, which are electrically connected to a current collector. Preferably, this conductive network of filaments is formed before particles of a cathode active material are bonded onto the exterior surface of the filaments. Shown in FIG. 2(B) is a case where some of the nano-wires have one of the two ends embedded in a current collector (e.g., made up of a conductive filler-polymer composite). This can be accomplished by (a) preparing a porous web or non-woven comprising nano-filaments, optionally along with a binder material and other filaments (the web having two opposing primary surfaces); (b) bonding electro-active material particles onto a surface of conductive nano-filaments from the first primary surface of the web (still leaving behind pores to accommodate electrolyte from this primary surface); and (c) impregnating the porous web with a resin from the opposite (or second) primary surface to make a conductive composite layer that serves as a current collector. In this preferred embodiment of the present invention, the resulting structure is an integrated, two-layer product consisting of a porous electro-active material layer (for lithium ion insertion and extraction) and a solid, conductive composite layer (as a current collector). In FIG. 2(A), the nano-filaments are bonded to one another at their points of intersection with a conductive binder material (e.g., conductive polymer, conductive filler-polymer adhesive, and carbonized resin binder). In FIG. 2(A), the aggregate or web of nano-filaments is bonded to a current collector using a conductive binder material. It may be noted that the conductive binder used for bonding electro-active material particles to nano-filaments, the binder for bonding filaments together at their points of contact, and the binder for bonding filaments to a current collector can be different binder materials, or the same binder material. Preferably, these binders are of the same chemical composition.

In the presently invented nano-filament composite electrodes (e.g., schematically shown in FIG. 2(A) and FIG. 2(B)), the network of interconnected nano-filaments or electron-conducting paths, is well-connected to a current collector. Individual nano-filaments would not be easily disconnected from the current collector. Nano-scaled filaments also tend to have a higher strength compared with micron-scaled or larger wires of the same material. Even if a nano-filament were to fracture into 2 or 3 shorter segments, these segments most likely will remain in physical or electronic contact with other nano-filaments of a network since each individual nano-filament is designed to contact its neighboring nano-filaments at several points of intersection.

Figure 1B:
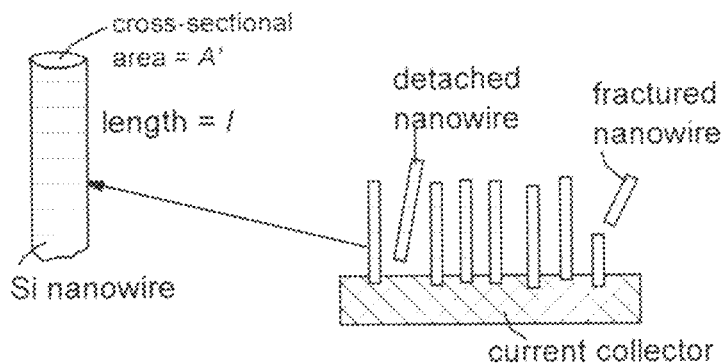

In contrast, as schematically shown in FIG. 1(B), the prior art electrode featuring end-connected nano-wires (e.g., in Ref. 19 for an anode and Refs. 24-26 for a cathode) has the tendency to get detached from the current collector. This is particularly severe for the case where nano-wires are grown from a catalyst phase coated on a current collector substrate (e.g., Ref. 19). Furthermore, in these prior art electrodes, once a nano-wire is fractured, only the end segment remains in electronic contact with the current collector (see the right-hand side of FIG. 1(B)). All other segments will become disconnected and ineffective in transport electrons to or from a current collector.

Catalytic growth is a powerful tool to form a variety of wire- or whisker-like structures with diameters ranging from just a few nanometers to the micrometer range. A range of phases (gas, solid, liquid, solution, and supercritical fluid) have been used as the feeder phase, i.e. the source of material to be incorporated into the nano-wire. The history of catalytic growth of solid structures is generally believed to begin with the discovery of Wagner and Ellis [Ref. 29] that Si whiskers or wires could be grown by heating a Si substrate in a mixture of $SiCl_4$ and $H_2$ with their diameters determined by the size of Au particles that had been placed on the surface prior to growth.

A range of metal catalysts have been shown to work for the synthesis of carbon nano fibers and CNTs. Pyrolysis of ethanol can be used in the presence of Fe, Co or Ni (the most common catalysts), Pt, Pd, Cu, Ag, or Au for the growth of single-walled carbon nanotubes (SW-CNT). For the latter three metals to work, not only do they have to be clean to start with, they must also be smaller than 5 nm in diameter for growth to be efficient. Both CNTs and vapor-grown CNFs are now commercially available, but at a high cost.

The art of catalytic synthesis of semiconductor or insulator-type nano wires from a wide range of material systems have been reviewed by Kolasinski [Ref. 30] and by Wang, et al. [Ref. 31]. These material systems include Si nanowires (SiNW), heterojunctions between SiNW and CNT, $SiO_x$ (a sub-stoichiometric silicon oxide), $SiO_2$, $Si_{1-x}Ge_x$, Ge, AlN, $\gamma$-$Al_2O_3$, oxide-coated B, $CN_x$, CdO, CdS, CdSe, CdTe, $\alpha$-$Fe_2O_3$ (hematite), $\epsilon$-$Fe_2O_3$ and $Fe_3O_4$ (magnetite), GaAs, GaN, $Ga_2O_3$, GaP, InAs, InN (hexangular structures), InP, $In_2O_3$, $In_2Se_3$, LiF, $SnO_2$, ZnO, ZnS, ZnSe, Mn doped $Zn_2SO_4$, and ZnTe. These nanowires can be coated with a conductive material (e.g., conjugate-chain polymer, metal, or carbon) and the resulting coated wires are used as a supporting substrate for electro-active material particles.

Metal nano wires can be produced using solution phase reduction, template synthesis, physical vapor deposition, electron beam lithography, and electrodeposition, as reviewed by Walter, et al. [Ref. 32]. Kogiso, et al. [Ref. 33] proposed a method of producing metal nano wires that included reducing a nano fiber comprising a metal complex peptide lipid. Metal nanowires can be used herein as conductive filaments.

Polymeric nano-fibers or nanowires may be produced by using a range of processes, including electro-spinning (e.g., Nanospider technology, electrohydrodynamic spinning, and nano-fiber alignment), splitting of bicomponent fibers, drawing, self-assembly, template synthesis, interfacial polymerization, phase separation method, solution spinning, film fibrillation, and melt fibrillation (e.g., melt blowing, melt fiber bursting, and melt film fibrillation).

A particularly preferred class of electrically conductive filaments for use in the present invention is the nano fibers obtained via electro-spinning of a polymer-containing fluid [e.g., Refs. 34-36] or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in a solution or melt form. The polymer may contain a desired amount of conductive additives to make the spun fibers electrically conductive. Because of the extremely small diameters and excellent uniformity of electro-statically spun fibers, high-quality non-woven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and conductive additive-containing PAN can be made into a solution, which is then electro-spun into nanometer fibers. The fibers can be successfully carbonized at 300-1,000° C. to produce carbon fiber webs with a tensile strength of 5.0 MPa (or much higher if containing carbon nano-tubes [CNTs] or nano graphene platelets [NGPs] as a conductive filler) and an electrical conductivity of >2.5 S/cm. The electrical conductivity can be increased by up to 4 orders of magnitude if the carbonized fiber is further graphitized at a temperature higher than 1,500° C. (typically in the range of 2,500 to 3,000° C.).

The nano graphene platelet (NGP) is a highly conductive nano-filler that can be incorporated in a polymer solution prior to electro-spinning. An NGP is essentially composed of a sheet of graphene plane or multiple sheets of graphene plane stacked and bonded together through van der Waals forces [Refs. 27,28]. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 µm and 10 µm, but could be longer or shorter.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper, carbon, a conductive organic, or a conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown carbon nano-fibers (VG-CNFs) and two orders of magnitude less expensive than CNTs.

Figure 4:
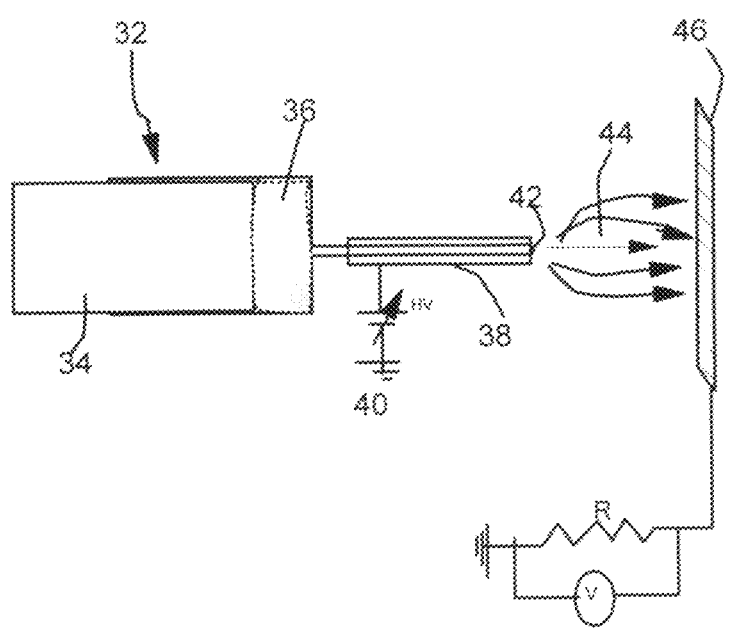
FIG. 4 Schematic of an electro-spinning device for producing polymer or pitch nano-fibers.

For illustration purposes, electro-spinning of a polymer or a polymer containing a conductive additive (e.g., NGPs or carbon black) is herein described. As schematically shown in FIG. 4, the process begins with the preparation of a polymer solution and, if a conductive additive is needed, dispersion of the additive in a polymer-solvent solution to prepare a suspension solution, which is contained in a chamber 36 of a syringe-type configuration 32. The syringe may be connected to a metering pump or simply contains a drive cylinder 34, which can be part of a metering device. A metal-coated or metal syringe needle 38 serves as an electrode, which is connected to a high-voltage power supply 40. When a sufficiently high voltage is applied, charges begin to build up in the suspension. At a critical charge level, repulsive forces overcome the surface tension of the suspension, ejecting streams of fluid out of an orifice 42. The streams of suspension, in the form of thin, elongated fibrils 44, move toward a collector screen 46 while the solvent vaporizes, leaving behind dried fibrils that are collected on the screen, which may be a counter electrode that is electrically grounded or at a potential different than the potential at the needle electrode 48. The collector screen 46 serves to collect the nanocomposite fibrils produced. It may be noted that that multiple syringes and needles can be operated concurrently to increase the nano-fiber production rate.

In a preferred mode of practice for producing electro-spun NGP-containing polymer nano fibers, the preparation of a suspension solution for electro-spinning is accomplished by first preparing two solutions (A=solvent+NGPs and B=solvent+polymer) and then mixing the two solutions together to obtain the suspension solution. The NGPs may be added to a solvent with the resulting suspension being subjected to a sonication treatment to promote dispersion of separate NGPs in the solvent. This fluid is a solvent for the polymer, not for the NGPs. For NGPs, this fluid serves as a dispersing medium only. The resulting suspension solution is hereinafter referred to as Suspension A. Suspension solution B is obtained by dissolving the polymer in the solvent with the assistance of heat and stirring action. Suspensions A and B are then mixed together and, optionally, sonicated further to help maintain a good dispersion of NGPs in the polymer-solvent solution.

With a syringe needle nozzle tip of approximately 2-5 µm, the resulting nanocomposite fibrils have a diameter typically smaller than 300 nm and more typically smaller than 100 nm. In many cases, fibrils as small as 20-30 nm in diameter can be easily obtained. It is of great interest to note that, contrary to what would be expected by those skilled in the art, the NGP loading in the resulting nanocomposite fibrils could easily exceed 15% by weight. This has been elegantly accomplished by preparing the suspension solution that contains an NGP-to-polymer weight ratio of 0.15/0.85 with the ratio of (NGP+polymer) to solvent being sufficiently low to effect ejection of the suspension into fine streams of fluid due to properly controlled suspension solution viscosity and surface tension. Typically, the (NGP+polymer)-to-solvent ratio is between 1/5 and 1/10. The excess amount of solvent or dispersion agent was used to properly control the fluid properties as required. The solvent or dispersing agent can be quickly removed to produce dried nanocomposite fibrils with the desired NGP loading. The NGPs have a thickness preferably smaller than 10 nm and most preferably smaller than 1 nm. Preferably, the NGPs have a width or length dimension smaller than 100 nm and further preferably smaller than 30 nm. These NGP dimensions appear to be particularly conducive to the formation of ultra-fine diameter nanocomposite fibrils containing a large loading of NGPs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating (or cross-linking) the polymer fibrils at a temperature of 150° C. to 300° C. in an oxidizing environment and then carbonizing the oxidized fibers at a temperature of 300° C. to 1,500° C. If further heat-treated at a temperature of 1,500° C.-3,000° C., the carbonized nano fibers become graphite nano fibers. The fibrils of the (PANi+PEO) mixture are intrinsically conductive and do not require any carbonization treatment. Electro-spinning also enables fibrils to intersect and naturally bond to one another for forming a web that has a desired network of conductive filaments. Non-conductive polymer nano-fibers may be coated with a thin layer of metal, conductive organic, or conductive polymer. Alternatively, a high carbon-yield polymer, such as phenolic resin and poly(furfuryl alcohol), may be coated onto the surface of a polymer nano-fiber. The resulting coated polymer nano-fiber is then subjected to pyrolyzation to convert the coating and the underlying polymer fiber to a polymeric carbon, thereby significantly increasing the electrical conductivity of the nano-fiber.

It may be noted that the electro-active material (e.g., Si nano particles for the anode or lithium cobalt oxide nano particles for the cathode) may be mixed with a carbonizable binder (e.g., phenolic resin or poly(furfuryl alcohol)) to form a slurry. This slurry is then brush- or roller-coated to a web of electro-spun polymer nano-fibers (e.g., PAN). Alternatively, the web can be dipped or immersed in the slurry for a desired length of time and then retrieved from the slurry. The solvent, if present, is allowed to vaporize. The binder and the polymer nano-fibers can then be carbonized concurrently.

Both conductive polymers, such as polyaniline, and non-conductive polymers can be produced into nanostructured forms, such as nanowires, nano-fibers (e.g., via electro-spinning as described above), nanotubes, and nanorods. For instance, synthesis of polyaniline nanostructures can be carried out both chemically and electrochemically by polymerizing the aniline monomers with the aid of either a hard template or a soft template. Template synthesis or template-assisted synthesis is applicable to non-conductive polymers as well.

Examples of hard templates include zeolite channels, track-etched polycarbonate, nanoporous membranes, and anodized alumina. Examples of soft templates for self-assembly of functional polymers include surfactants, polyelectrolytes, or complex organic dopants, such as micelles, liquid crystals, thiolated cyclodextrins, and polyacids, which may be capable of directing the growth of polyaniline one-dimensional nanostructures with diameters smaller than 500 nm. Adding structure-directing molecules such as surfactants or polyelectrolytes to the chemical polymerization bath is one way to obtain polyaniline nanostructures. Organic dopants with surfactant functionalities can be used to form emulsions or micelles, leading to nanotube, nano-wire, or nanorod structures. For instance, dopants such as sulfonated naphthalene derivatives, fullerenes, or dendrimers, may be utilized. Electrochemical polymerization and physical methods, such as electrospinning and mechanical stretching can produce conducting polymer nano-wires without templates.

Polymer nano wires can be electrically conductive if the precursor polymer is intrinsically conductive. For non-conductive polymers, however, conductive fillers, such as carbon black, nano metal particles, CNTs, and nano graphene platelets (NGPs), may be added to the polymer solution prior to nano-wire formation. The resulting nano-wire will be electrically conductive. A polymer nano-wire may become surface-conductive if the wire surface is deposited with a conductive material, such as copper, carbon, a conductive organic, a conductive polymer, a polymeric carbon, or a chemical vapor deposited carbon, etc. In addition, carbonization and optional graphitization of a polymer nano wire can significantly increase the electrical conductivity. A major advantage of conductive nano-wires and carbonized nano wires is their relatively low cost, which can be an order of magnitude less expensive than vapor-grown carbon nano-fibers (VG-CNFs) and two orders of magnitude less expensive than CNTs.

Nano-wires can be made from conducting polymers, such as poly(3,4-ethylene-dioxythiophene) doped with poly(4-styrenesulfonate) (PEDOT-PSS), polyaniline, polypyrrole, and poly[(9,9-dioctylfluorenyl-2,7-diyl)-co-(bithiophene)] (F8T2). In one process, a stamp is made by casting an elastomer onto diffraction gratings with lines at a spacing of typically 1200 to 3600 lines/mm. Then, the stamp is placed onto the wafer surface and a drop of the polymer in aqueous solution is added to the stamp. The polymer solution migrates into the stamp's capillaries and, after time for the polymer to dry out, removal of the stamp exposes polymer nanowires with a repeat period of 278 nm to 833 nm. By using a smaller template and a different elastomer one could fabricate the stamp to produce nanowires of less than 100 nm wide.

In a second process, F8T2 polymer solution can be poured to wet out and permeate into meso- or nano-scaled pores of an alumina template. Upon removal of the solvent, polymer nano-wires are formed in the pores. Following liberation from the template, discrete nanowires with lengths higher than 15 mm and mean diameters of from 50-500 nm can be obtained.

In a third method, polyaniline, polypyrrole and poly (EDOT) nanowires, typically with a diameter in the range of 60-150 nm, can be obtained from their respective monomer solutions by performing sequential electrochemical polymerizations in micro-fluidic channels. Under very gentle electrochemical conditions, the conducting polymer chains can be self-organized into polymer nanowires with novel polycrystalline structures.

Preferred nano-wire polymers are polyacrylonitrile (PAN) and a mixture of polyaniline (PANi) and polyethylene oxide (PEO). Just like the cases of electro-spun polymer nano-fibers, PAN nano-wires obtained by template-assisted growth can be readily converted into carbon nano fibers by heating (or cross-linking) the polymer nano-wires at a temperature of 150° C. to 300° C. in an oxidizing environment and then carbonizing the oxidized nano-wires at a temperature of 300° C. to 1,500° C. If further heat-treated at a temperature of 1,500° C.-3,000° C., the carbonized nano-wires become graphite nano wires. The nano-wires of the (PANi+PEO) mixture are intrinsically conductive and do not require any carbonization treatment. Non-conductive polymer nano-wires may be coated with a thin layer of metal, conductive organic, or conductive polymer. Alternatively, a high carbon-yield polymer, such as phenolic resin and poly(furfuryl alcohol), may be coated onto the surface of a polymer nano-wire. The resulting coated polymer nano-wire is then subjected to pyrolyzation to convert the coating and the underlying polymer nano-wire to a polymeric carbon, thereby significantly increasing the electrical conductivity of the nano-wire.

Multiple filaments can be readily combined to form an aggregate, such as in a mat, web, non-woven, or paper form. Several techniques can be employed to fabricate a conductive aggregate of filaments (a web or mat), which is a monolithic body having desired interconnected electron-conducting paths. In one preferred embodiment of the present invention, the porous web (for either anode or cathode use) can be made by using a slurry molding or a filament/binder spraying technique. These methods can be carried out in the following ways (as illustrative examples):

As a wet process, aqueous slurry is prepared which comprises a mixture of filaments (comprising nano-wires) and, optionally, about 0.1 wt % to about 10 wt % resin powder binder (e.g., phenolic resin). The slurry is then directed to impinge upon a sieve or screen, allowing water to permeate through, leaving behind filaments and the binder. As a dry process, the directed fiber spray-up process utilizes an air-assisted filament/binder spraying gun, which conveys filaments and an optional binder to a molding tool (e.g., a perforated metal screen shaped identical or similar to the part to be molded). Air goes through perforations, but the solid components stay on the molding tool surface.

Figure 5:
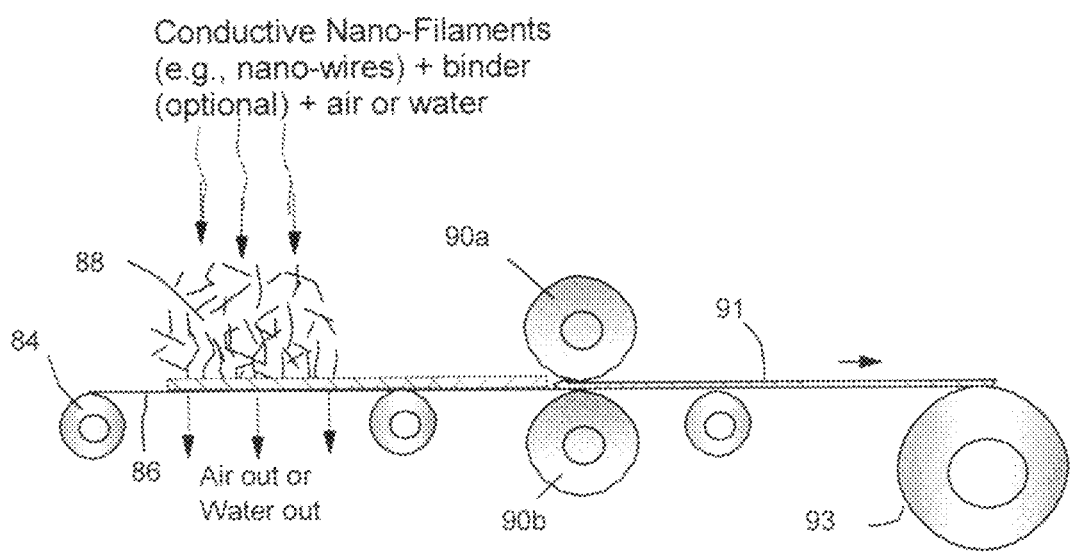
FIG. 5 Schematic of a roll-to-roll apparatus for producing a roll of mats or webs from nano-wires or other nano filaments.

Each of these routes can be implemented as a continuous process. For instance, as schematically shown in FIG. 5, the process begins with pulling a substrate 86 (porous sheet) from a roller 84. The moving substrate receives a stream of slurry 88 (as described in the above-described slurry molding route) from above the substrate. Water sieves through the porous substrate with all other ingredients (a mixture of filaments and a binder) remaining on the surface of the substrate being moved forward to go through a compaction stage by a pair of compaction rollers 90*a*, 90*b*. Heat may be supplied to the mixture before, during, and after compaction to help cure the thermoset binder for retaining the shape of the resulting web or mat. The web or mat 91, with all ingredients held in place by the thermoset binder, may be stored first (e.g., wrapped around a roller 93).

Similar procedures may be followed for the case where the mixture 88 of filaments and the binder is delivered to the surface of a moving substrate 86 by compressed air, like in a directed fiber/binder spraying route described above. Air will permeate through the porous substrate with other solid ingredients trapped on the surface of the substrate, which are conveyed forward. The subsequent operations are similar than those involved in the slurry molding route.

The nano-wire web may be later uncoiled from a collector roller and moved into a heat treatment zone for carbonization and optional graphitization. A conductive coating may be deposited onto the surface of non-conductive polymer nano-wires through various deposition techniques; e.g., dip-coating of a conductive polymer, conductive organic, or metal (e.g., tin, zinc, or copper) or thermal physical vapor deposition of metal or chemical vapor deposition of amorphous carbon. These coating processes are well-known in the art.

In a preferred embodiment of the present invention, the step of providing a porous web, non-woven, paper-like structure, or any type of aggregate or preform of nano-wires (or any other type of nano-filaments) may comprise mixing the nano-wires with a carbonizable binder to form a nanocomposite and then carbonizing the binder to form a porous nanocomposite. During the carbonization procedure, many macro or micro pores are formed since most, if not all, non-carbon elements are removed. Alternatively and more preferably, the step of providing a porous aggregate may comprise mixing the nano-wires with a carbonizable binder to form a porous web, nonwoven, or paper-like structure, followed by carbonizing the binder to form the aggregate. Carbon is normally formed at the points of contact between nano-wires, providing continuity of electron transport paths. The result is essentially the formation of a 3-D network of electron-conducting paths. In this process, the carbonizable binder may be selected from a carbonizable polymer, coal tar pitch, petroleum pitch, mesophase pitch, or a combination thereof. Preferably, the carbonizable binder is selected from poly(acrylonitrile), poly(furfuryl alcohol), poly(amic acid), polyimide, phenolic resin, or a combination thereof.

The second step in making the presently invented nanocomposite electrode comprises bonding a cathode or anode active material (in the form of sub-micron or nano-scaled particles) onto to the surfaces of conductive nano-filaments using a conductive binder material. The nano-filaments form a network of electron transport paths for dramatically improved electrical conductivity or reduced internal resistance (hence, reduced energy loss and internal heat build-up). It appears that the mechanical flexibility and strength of the conductive filaments selected in the present study enables the electro-active nano particles to undergo strain relaxation quite freely during the charge-discharge cycling process of the lithium battery. Consequently, the particles remain in a good contact with the underlying filaments. Due to adequate strength and toughness, the filaments themselves remain essentially intact (not cracked or fractured) when the particles undergo expansion or contraction. No significant fragmentation or pulverization of the particles was observed in all of the hybrid nano materials investigated.

The electro-active particles, with a diameter less than 1 µm (preferably less than 500 nm and most preferably less than 100 nm), are bonded on a surface of a nano-scaled substrate filament, preferably covering a majority of the exterior surface of the filament.

In the presently invented lithium battery featuring a nano filament composite type cathode, the anode may be a lithium or lithium alloy film or foil. In a lithium ion battery, the anode may be a carbon- or graphite-based material, such as graphite particles and meso-carbon micro-beads (MCMBs). Preferably, the anode is also made according to the presently invented nanocomposite platform technology.

For a lithium ion battery, according to a preferred embodiment of the present invention, the anode active material (in a fine powder form) may be selected from the following groups of materials:
  (a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 µm, more preferably thinner than 1 µm, and most preferably thinner than 100 nm;
  (b) The alloys or intermetallic compounds of Si, Ge, Sn, Pb, Sb, Bi, Zn, Al, or Cd, stoichiometric or non-stoichiometric with other elements; and
  (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

In this case, the anode comprises (a) an aggregate of electrically conductive nano-filaments that are substantially interconnected, intersected, or bonded to form a porous, electrically conductive filament network, wherein the filament network comprises substantially interconnected pores and the filaments have an elongate dimension (length) and a diameter (or thickness) with the diameter being preferably less than 1 µm (preferably less than 500 nm and more preferably less than 100 nm); and (b) micron- or nanometer-scaled particles that are bonded to a surface of the filaments, wherein the particles comprise an anode active material capable of absorbing and desorbing lithium ions and the particles have a diameter less than 1 µm, preferably less than 500 nm, and most preferably less than 100 nm.

Preferably, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). Preferably, this conductive network of filaments is formed before particles of an anode active material, such as Si, Ge, Sn, and $SiO_2$, are bonded onto the exterior surface of the filaments, preferably using the same conductive binder material. The aggregate or web has substantially interconnected pores that are intended for accommodating the electrolyte in a battery.

In either an anode or cathode featuring a presently invented nanocomposite material, the most important property of a filament used to support the electro-active particles is high electrical conductivity. This will enable facile collection of the electrons produced by the anode active material, or the transport of the electrons reaching the cathode active material with minimal resistance. A low conductivity implies a high resistance and high energy loss, which is undesirable. The filament should also be chemically and thermo-mechanically compatible with the intended nano particles to ensure a good contact between the filament and the particles during the cycles of repeated charging/discharging and heating/cooling. As an example, a Si-based particle can undergo a volume expansion up to a factor of 4 (400%) when Si absorbs Li ions to its maximum capacity (e.g., as represented by $Li_{4.4}Si$). As another example, the lithium cobalt oxide particle may also undergo a volume change greater than 40%. By contrast, conventional anode active or cathode active materials in a powder form (i.e., particles bonded by a non-conductive binder with the hope that carbon black will provide the conductivity) or thin-film form (e.g., Si powder and $LiCoO_2$ film directly deposited on a current collector surface) have a great propensity to get fragmented (or chains of carbon black particles get interrupted), losing contact with the current collector.

A wide range of processes can be used to bond particles of a cathode active or anode active material to the surfaces of nano-filaments with a conductive binder material. For instance, this may be accomplished by dipping a web of conductive filaments in a nano particle-solvent suspension (containing a conductive binder), followed by solvent evaporation. Simple spraying, spin coating, or brush coating may be used to introduce a particle-suspension or a sol-gel fluid (containing a conductive binder) into the pores of a web. When the solvent is vaporized or the fluid is dried, the particles will bind to the filament surface. After the binder material is cured or solidified, the particles are usually well-bonded to the nano-filaments. Quite surprisingly, the resulting particles have superior compatibility with the underlying conductive nano-filaments. Furthermore, upon repeated charges and discharges, the particle and binder integrity was found to be usually well-maintained, leading to a long battery cycle life. Thus far, this has not been recognized or taught in the prior art. The best binder material was found to be a polymeric carbon, such as that obtained by carbonizing phenolic resin or poly(furfuryl alcohol).

The anode active material for use in the presently invented lithium ion battery preferably includes at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). When any of these two sets of elements are included as a primary element of an electro-active material (defined as being capable of absorbing and extracting lithium ions in the present context), which is bonded on filaments, the cycling stability of the resulting anode material can be significantly improved.

Another preferred class of anode active material that can be bonded to the surface of filaments include the oxides, carbides, nitrides, sulfides, phosphides, selenides, tellurides, or their mixtures (e.g., co-oxides or composite oxides) of: (a) Si, Ge, Sn, Pb, Sb, Bi, Zn, Al, Fe, or Cd for anode active materials; or (b) Co, Ni, Mn, V, Ti for cathode active materials. They can be readily produced in a thin-film or coating form. For instance, Sn alone may be vaporized using an arc plasma heating technique to produce Sn vapor in a reactor and, concurrently, a stream of oxygen gas is introduced into the reactor to react with Sn vapor. The reaction product, SnO, is in a nano cluster form, which can be directed to deposit onto a desired substrate (e.g., a web of carbonized nano-fibers). Alternatively, Sn admixed with B, Al, P, Si, Ge, Ti, Mn, Fe, or Zn may be subjected to co-vaporization and an oxidative reaction to obtain composite oxides. The $SnS_2$ particles may be deposited onto a web of filaments by placing the web in a reaction chamber, into which are introduced two streams of reactants—a stream of Sn vapor produced by arc plasma heating and a stream of S vapor obtained by sublimation or vaporization.

Lithium cobalt oxide ($LiCoO_2$) is one of the most important cathode materials used in lithium-ion secondary batteries. $LiCoO_2$ and other similar lithium transition metal oxides, such as lithium manganese oxide, lithium nickel oxide, and lithium vanadium oxide, can be prepared by various methods using different lithium and transition metal sources. In general, bulk transition metal oxides are prepared by solid-state reactions, which involve repeated heat processes at high temperatures. Such processes generally afford the thermodynamically more stable phases and in general, microcrystalline materials are obtained. Lower temperatures and mild processing conditions may be used for several methods, such as co-precipitation, sol-gel process with/without template, synthesis by precursor, ion-exchange reaction and hydrothermal. These methods also result in particles with better control of morphology and smaller size. Other methods include flame spray pyrolysis, dehydro-freezing evaporation, supercritical dehydration, supersonic hydrothermal synthesis, and ultrasonic processing.

As an example, a process for producing lithium-cobalt oxide my include (a) mixing cobalt oxide having an average particle size of not more than 0.1 µm, with a lithium compound; and (b) calcining the obtained mixture at a temperature of 500 to 850° C. As compared to the conventional processes that begin with larger cobalt oxide particles (e.g., diameter>10 μm), such a process is advantageous in that lithium-cobalt oxide particles (1) can be produced with a short calcination time, (2) have a narrow particle size distribution, and (3) have a uniform small particle size.

The flame-spray pyrolysis method may include the steps of: (a) spraying minute droplets containing a solution of dissolved lithium salt and cobalt salt at room temperature; (b) atomizing the minute droplets through rapid expansion into a high temperature environment generated by combusting oxygen and hydrogen; (c) decomposing and oxidizing the atomized minute droplets thermally at high temperature to produce nano-sized oxides in gaseous phase; and (d) collecting the produced nano-sized composite oxides particles.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. A major drawback with this material is that it has very low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. The presently invented nano filament composite approach overcomes this major problem by using a nano-scaled powder (to reduce the Li ion diffusion path and electron transport path distance) bonded on the surface of conductive filaments (that help collect the electrons). Lithium iron phosphate ($LiFePO_4$) nano particles may be prepared by ball milling of conventional micron-sized particles, which may be prepared by a solid state reaction using $LiOH.H_2O$, $(CH_3COO)_2Fe$, and $NH_4H_2PO_4$ as raw materials. Additionally, $Li_{1.3}Al_{0.3}Ti_{1.7}(PO_4)_3$ materials, as an example of lithium mixed-metal phosphate, may be successfully prepared by the solution deposition using lithium acetate, aluminum nitrate, ammonium dihydrogen phosphate and titanium butoxide as starting materials. The resulting material may be ball-milled to sub-micron or nanometer scales. This is but one example of a host of complex metal phosphate-based cathode materials.

Other cathode active particles may be bonded on a web surface using similar processes. For instance, manganese sulfide (γ-MnS) may be prepared on a substrate by chemical bath deposition (CBD) method at room temperature (27° C.). Combined atomization (or vaporization) and reaction can be used to obtain nano particles of the oxides, carbides, nitrides, sulfides, phosphides, selenides, tellurides, or their mixtures, as illustrated in [Ref. 37] (W. C. Huang, "Method for the Production of Semiconductor Quantum Particles," U.S. Pat. No. 6,623,559 (Sep. 23, 2003)) and [Ref. 38] (J. H. Liu and B. Z. Jang, "Process and Apparatus for the Production of Nano-Scaled Powders," U.S. Pat. No. 6,398,125 (Jun. 4, 2002)).

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred.

The content of aforementioned electrolytic salts in the non-aqueous solvent is preferably 0.5 to 2.0 mol/l.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. The grain sizes of the crystalline phases were determined by the Scherer equation. When the grain size was calculated to be less than 50 nanometers, the phase was considered to be nanocrystalline. In several cases, scanning electron microscopy (SEM) and transmission electron microscopy (TEM) were used to characterize the structure and morphology of the samples.

In a typical procedure, a web of filaments (with nano particles bonded thereon with a conductive binder) was bonded, with a conductive adhesive, onto a copper foil (for anode) or aluminum foil (for cathode) as a current collector. In some cases, webs of filaments were bonded to a current collector prior to or during the particle bonding procedure. An NGP-containing adhesive was used as a conductive binder for this purpose. Filaments may also be bonded by an intrinsically conductive polymer. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

For the preparation of control samples (particle-based), the cathode of a lithium battery was prepared in the following way. First, 80% by weight of lithium cobalt oxide powder $LiCoO_2$, 10% by weight of acetylene black, and 7-10% by weight of PVDF (in NMP solvent) or of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode.

A positive electrode, a separator composed of a porous polyethylene film, and a negative electrode was stacked in this order. The stacked body was spirally wound with a separator layer being disposed at the outermost side to obtain an electrode assembly as schematically shown in FIG. 3. Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the non-aqueous electrolyte were placed in a bottomed cylindrical case made of stainless steel, thereby obtaining a cylindrical lithium secondary battery.

The following examples are presented primarily for the purpose of illustrating the best mode practice of the present invention, not to be construed as limiting the scope of the invention.

Example 1

Conductive Web from Polyimide Nano-Wires

Poly(amic acid) (PAA) precursors were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was filled into the pores of a template membrane (pore size of approximately 400 nm), which was commercially available polycarbonate filters (Poretics). An approximately 1 cm² piece of the polycarbonate filter was immersed in the precursor solution. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-wire with an average nano-wire diameter of 127 nm. The resulting PI nano-wires were formed into a web using the method described earlier (schematically shown in FIG. 5).

Example 2

Conductive Nano-Wires from Template-Assisted Fabrication of Polyacrylonitrile (PAN) Nano-Wires Several types of meso-porous template membranes are commercially available (e.g., from (Poretics, Inc., Whatman, and Osmonics). Our PAN nanowires were grown in track-etched polycarbonate membranes (pore size 200 nm). PAN was dissolved in N,N,-dimethyl formamide (DMF) to obtain a solution at 80° C. using a magnetic stirrer 30 minutes. The template membrane was immersed in the PAN-DMF solution at 60° C. while solvent was vaporized in a vented chemical fume hood. This procedure was continued until solvent was mostly removed and PAN was in situ-crystallized into nano-wires in the pores of the membrane.

The PAN nano-wires, along with the polycarbonate membrane, were heat-treated first at 200° C. in an oxidizing environment (laboratory air) for 45 minutes, then at 550° C. for one hour in a nitrogen environment (to decompose and decouple polycarbonate from PAN), and finally at 1,000° C. in an inert atmosphere for 2 hours. The resulting carbonized PAN nano-wires are referred to as Samples c-PAN-wires. Their diameters became approximately 95 nm.

Example 3

Preparation of Conductive Webs from Carbonized Pan Nano-Wires and Mixtures of Carbonized Nano-Wires and Carbon Nano-Fibers (CNFs)

Figure 6:
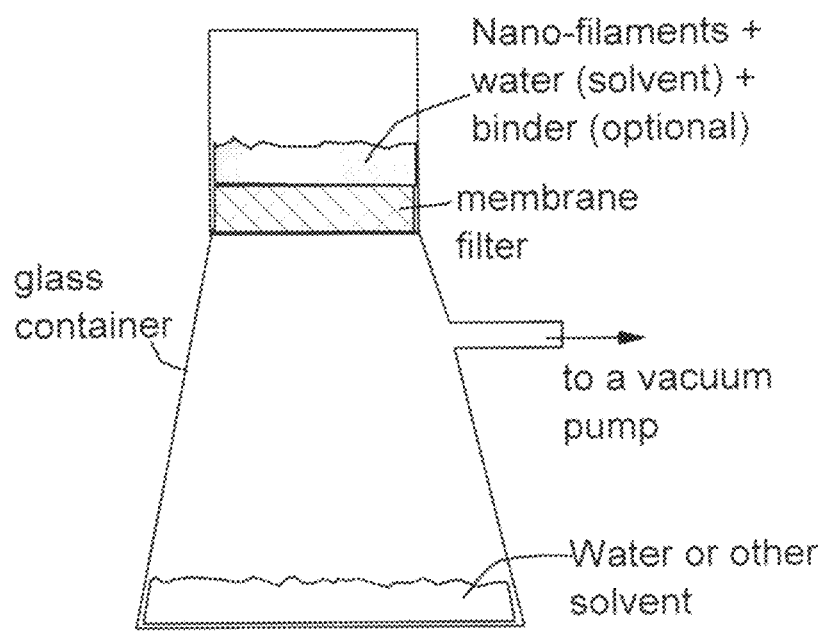
FIG. 6 Schematic of an apparatus for producing a mat, web or sheet of conductive nano filaments.

A modified paper-making process, as schematically illustrated in FIG. 6, was used to prepare mats (or sheets of paper) of carbonized nano-wires (0% CNFs) and mixtures of carbonized nano-wires and CNFs (30% CNFs by weight). A suspension (dispersion of carbonized nano-wires in water, plus a desired proportion of another nano filament, such as CNFs) was fed from the top portion of a filtering apparatus that was equipped with a porous membrane. Water was permeated through the membrane and collected at the bottom portion of the apparatus. Permeation of water was facilitated with a pressure differential generated by a vacuum pump. The solid contents (nano-wires or a mixture of nano-wires and CNFs, plus an optional binder) left on top of the membrane formed a good piece of paper or mat, which was characterized by having a network of overlapping filaments or interconnecting electron-transporting paths. The web samples prepared are denoted as c-PAN-wire and c-PAN-wire/CNF, respectively.

Example 4

Conductive Web of Filaments from Electro-Spun PAN Fibrils and NGP-Containing PAN Fibrils Suspension solutions were obtained by first preparing two solutions (A=solvent+NGPs and B=solvent+polymer) and then mixing the two solutions together to obtain the suspension solution. In the case of NGP-containing PAN fibril, the solvent used was N,N,-dimethyl formamide (DMF). For the preparation of Suspension A, the NGPs were added to a solvent and the resulting suspensions were sonicated to promote dispersion of separate NGPs in the solvent with a sonication time of 20 minutes. Suspension solution B was obtained by dissolving the polymer in the solvent with the assistance of heat (80° C. for DMF+PAN) and stirring action using a magnetic stirrer typically for 90 and 30 minutes, respectively. Suspensions A and B were then mixed together and further sonicated for 20 minutes to help maintain a good dispersion of NGPs in the polymer-solvent solution. An electrostatic potential of 8 kV was applied over a distance of 7 cm between the syringe needle tip and a 10 cm×10 cm porous aluminum plate that was grounded.

Two NGP-polymer compositions in the original suspension solution were prepared (based on (NGP wt.)/(NGP wt.+ polymer weight)): 0% and 5%. The resulting nanocomposite fibrils, after the solvent was completely removed, had comparable NGP-polymer ratios as the original ratios. They are designated as Samples PAN-0-B and PAN-5-B, respectively. The average diameter of these fibrils was approximately 165 nm and 233 nm, respectively.

The NGP-PAN nanocomposite fibrils were converted to carbon/carbon composite nano-fibers by heat-treating the fibrils first at 200° C. in an oxidizing environment (laboratory air) for 45 minutes, 600° C. for 1 hour in an inert atmosphere, and then at 1,000° C. also in an inert atmosphere for 2 hours. The resulting carbonized sample, having an average diameter of 178 nm, is referred to as Samples c-PAN-5-B. NGP-free PAN fibrils were also carbonized under comparable conditions to obtain Sample c-PAN-0-B. Their diameters became approximately 124 nm.

Example 5

Preparation of Tin (Sn) Nanowires as a Substrate (Web of Conductive Filaments)

Sn nanowires were grown in track-etched polycarbonate membranes (Osmonics, Livermore, Calif.). The pores in these membranes are ID channels with pore diameters of 50 nm and are aligned perpendicular to the face of the membrane within ±17°. The thickness and pore density of the membranes are 6 μm and 6×10$^8$ pores/cm$^2$, respectively. The electrolyte used for electrodeposition was 0.1 M $Sn_2SO_4$ aqueous solution with 2% gelatin by weight, and the pH value was adjusted to be near 1 with concentrated $H_2SO_4$.

Before electrodeposition, a 150-nm Au film was evaporated onto one side of the membrane that served as the conducting cathode for electrodeposition. A pure tin wire was used as the anode, and electroplating was conducted under a constant voltage of 280 mV using a two-electrode system in a quartz tube cell at room temperature. The nanowires were collected by dissolving the polycarbonate membrane in dichloromethane and precipitating them from the solvent by the use of a centrifuge. The freestanding nanowires were then stored in suspension in n-ethyl alcohol containing 0.1% by weight of poly(furfuryl alcohol) as a binder. The suspension was filtered with a membrane-based filtering set-up schematically shown in FIG. 6. The resulting product is a piece of paper or web composed of tin nano-wires bonded by poly (furfuryl alcohol), which could be carbonized to become a conductive binder. This carbonization procedure was carried out either prior to or during the electro-active material particle bonding procedure.

Example 6

Preparation of NGP-Based Webs (Aggregates of NGPs and NGPs+CNFs)

Continuous graphite fiber yarns (Magnamite AS-4 from Hercules) were heated at 800° C. in a nitrogen atmosphere for 5 hours to remove the surface sizing. The yarns were cut into segments of 5 mm long and then ball-milled for 24 hours. The intercalation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite fibers (20 g) were added under vigorous stirring to avoid agglomeration. After the graphite fiber segments were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite fiber sample. The dried, expandable graphite fiber sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated NGPs. Approximately half of the NGP-containing suspension was filtered and dried to obtain several paper-like mats, referred to as Sample NGP-100. Vapor grown CNFs were then added to the remaining half to form a suspension containing both NGPs and CNFs (20%), which was dried and made into several paper-like mats (Sample NGP-CNF-20).

Example 7

Preparation of Conductive Webs from CNTs and Vapor-Grown CNFs

Commercially available multi-walled CNTs and vapor-grown CNFs (Applied Science, Inc., Cedarville, Ohio) were separately made into conductive webs using a paper-making procedure as schematically shown in FIG. 6. Basically, a slurry of CNTs or CNFs was poured over a top surface of a Teflon-based membrane with sub-micron pores. Water permeates through the membrane pores with the assistance of a suction force created by a vacuum pump-generated pressure differential between the top surface and the bottom surface of the membrane. Solid ingredients (CNTs or CNFs) stay on the top surface of the membrane, which may be separated from the membrane and dried to become a sheet of porous paper or mat (Sample CNT and Sample CNF).

Example 8

Preparation of Electro-Active Nano Particles ($LiCoO_2$-Based Cathode Material)

A micro-emulsion method was used to prepare nano-scaled lithium cobalt oxide particles. Stoichiometric $LiNO_3$ and $Co(NO_3)_2 6H_2O$ were dissolved in water to form an aqueous phase. The salinity of the aqueous phase was varied between 1 M and 2 M. The primary component of the oil phase was analytical grade cyclohexane. 1-Hexanol [$CH_3(CH_2)_6OH$] and OP-10 [polyoxyethylene octylphenyl ether, $4$-$(C_8H_{17})C_6H_4(OCH_2CH_2)_nOH$, n≈10] were chosen as the surfactant and co-surfactant, respectively. The volume ratio of the surfactant to the co-surfactant was adjusted to 3:2. The well-mixed water phase was added to the oil phase with the volume ratio maintained at 1:10. After thorough stirring, a thermodynamically stable micro-emulsion system was obtained. This micro-emulsion was added dropwise to the hot oil phase at 200° C. via a peristaltic pump. The obtained precursors were further dried at 400° C. to remove organic phase. The dried powders were calcined at 850° C. for 2 hours. The $LiCoO_2$ particle sizes were found to be between 85 and 150 nm.

Example 9

Preparation of Electro-Active Nano Particles ($\gamma$-$LiV_2O_5$-Based Cathode Material)

A simple and mild solvo-thermal method may be used for the synthesis of $\gamma$-$LiV_2O_5$. In this process, elongated $\gamma$-$LiV_2O_5$ nano particles were synthesized directly from the solvo-thermal reaction of $V_2O_5$, LiOH and ethanol at 160° C. in an autoclave. Ethanol was employed as a solvent as well as a reducing agent. In a 50-ml Teflon vessel, 0.02 mol of analytically pure LiOH and $V_2O_5$ were mixed in 40 ml of ethanol. The mixture was subjected to magnetic stirring for 30 minutes. The Teflon vessel containing the mixture was then put into a stainless steel autoclave, which was maintained at 180° C. under autogenous pressure for 18 hours. The mixture was then allowed to cool to room temperature naturally. The as-formed solid precipitate was filtered, washed with ethanol and dried at 100° C. for 2 hours. Transmission electron microscopic examinations of the solid precipitate indicates that the $\gamma$-$LiV_2O_5$ particles have a length of 0.3-3 μm and a transverse dimension (diameter) of approximately 30-50 nm. Presumably, the reaction can be expressed as follows: $2LiOH + V_2O_5 + CH_3CH_2OH \rightarrow 2\gamma$-$LiV_2O_5 + CH_3CHO + 2H_2O$.

Compared with the conventional preparation methods for $\gamma$-$LiV_2O_5$, this solvo-thermal method is less expensive and chemically milder. In particular, vacuum, argon/nitrogen protected atmosphere, or post-annealing is not necessary for this simple one-step process. This process offers a potentially low-temperature, low-cost, and environmentally friendly way of producing single-phase, uniform-particle size, and fine-grained $\gamma$-$LiV_2O_5$ for rechargeable lithium batteries.

Example 10

Preparation of Electro-Active Nano Particles ($LiMn_2O_4$-Based Cathode Material)

A particularly useful process involves the insertion of lithium into electrolytic manganese dioxide (EMD) in an aqueous medium with glucose as a mild reductant in open air. The material resulting from calcination is pure, spinel-structured $LiMn_2O_4$ particles of sub-micrometric and nanometric size. In one example, the synthesis procedure entailed dissolving 75.4 g of lithium hydroxide (Aldrich) in 3 L of double-distilled water in a 10-L beaker. To this solution, 156.6 g of EMD was added and the resulting slurry was stirred for 1 hour at 80° C. Then 7.5 g of glucose dissolved in 500 mL of water was added while the slurry was being stirred, which was followed by the addition of 4 L of water. The stirring (reaction) was continued further for 8 hours at 80° C. At the end, the reaction slurry was 7.5 L and allowed to cool and settle for 12 hours. The solid product was washed several times with pure water and then dried at 120° C. The powder was calcined at 775° C. for 24 h in porcelain dishes. The particle sizes of the resulting $LiMn_2O_4$ are typically in the range of 40-120 nm.

Example 11

Solution Precipitation of $Li_{1+x}Mn_yFe_zPO_4$ Nano Particles $Li_{1+x}Mn_yFe_zPO_4$ nano particles (where $0<x\leq0.3$, $0.5<y<0.95$, and $0.9<y+z\leq1$) were successfully prepared by a solution precipitation method using lithium acetate, manganese nitrate, and ammonium dihydrogen phosphate as starting materials. Stoichiometric lithium acetate ($Li(CH_3COO) \cdot 2H_2O$), manganese nitrate ($Mn(NO_3)_2$), and ammonium dihydrogen phosphate ($NH_4H_2PO_4$) were dissolved in 2-methoxyethanol ($CH_3OCH_2CH_2OH$). Then a small amount of concentrated nitric acid was added. Dust and other suspended impurities were removed from the solution by filtering through 0.2 mm syringe filter to form the $Li_{1+x}Mn_yFe_zPO_4$ precursor solution. The precursor solution was heated at a heating rate of 10° C./min to 380° C. in air and maintained at 380° C. for 10 min to remove a desired amount of the solvents and other organic substances. The resulting solution was atomized (aerosolized) into a chamber with stainless steel walls preset at 400° C. Upon solvent vaporization, $Li_{1+x}Mn_yFe_zPO_4$ particles were collected in the chamber. The particle sizes were typically in the range of 120-180 nm. It may be noted that, in this process, the addition of concentrated nitric acid was a key step to form the precursor solution for $Li_{1+x}Mn_yFe_zPO_4$. Nitric acid significantly enhanced the solubility of $NH_4H_2PO_4$ in the mixture of solution (it was otherwise very difficult to dissolve $NH_4H_2PO_4$ in 2-methoxyethanol or other alcohol).

Example 12

Bonding of Electro-active Nano Particles to a Conductive Web with a Conductive Binder An array of processes can be used to bond particles of a cathode active or anode active material to the surfaces of nano-filaments with a conductive binder material. Typically, the process begins with preparing a slurry or suspension of nano particles, a solvent, and a conductive binder material (or precursor to a conductive binder). In one example, this step is followed by dipping a web of conductive filaments in this suspension, retreating from the suspension, and then removing the solvent. Alternatively, simple spraying, spin coating, or brush coating may be used to introduce a suspension or a sol-gel fluid (containing a conductive binder) into the pores of a web. When the solvent is vaporized or the fluid is dried, the particles will bind to the filament surface. After the binder material is cured or solidified, the particles are usually well-bonded to the nano-filaments. In the present study, phenolic resin and poly(furfuryl alcohol) are the two most commonly used binder materials that require a subsequent carbonization step to achieve a good electrical conductivity.

It may be noted that this carbonization procedure and the carbonization of PAN nano-fibers (or other polymeric nano-fibers or polymer nano-wires) can be carried out concurrently. For instance, approximately one (1) g of phenolic resin, 1 g of Si nano particles (<85 nm in diameter), and 20 g of toluene were mixed to obtain a suspension. A web of PAN nano-fibers (pre-oxidized at 250° C. for 30 minutes) was immersed in this suspension for two minutes, taken out of the suspension, and then dried at 150° C. for 10 minutes. The resulting Si particle-coated oxidized PAN nano-fibers were then pyrolyzed at 450° C. in an argon atmosphere for 10 minutes and then 800° C. for one hour. The end product was a web of carbonized nano-fibers with Si nano particles bonded thereon via a polymeric carbon binder.

A broad range of conductive, porous nanocomposite-based electrode compositions, summarized in Table 1 were prepared in the present study.

Example 13

Evaluation of Electrochemical Performance of Various Nano Particle Bonded

Filament Webs

The electrochemical properties were evaluated under an argon atmosphere by both cyclic voltammetry and galvanostatic cycling in a three-electrode configuration, with the filament web/nanoparticle/binder (coated on copper substrate) as the working electrode and Li foil as both the reference and counter-electrodes. A conductive adhesive was used to bond the filament end portions to the copper foil, which serves as a current collector. Charge capacities were measured periodically and recorded as a function of the number of cycles. The charge capacity herein referred to is the total charge inserted into the filament web/nanoparticle/binder, per unit mass of the electrode material (counting the weights of nano particles, substrate filament web, and conductive binder), during Li insertion, whereas the discharge capacity is the total charge removed during Li extraction. The morphological or microstructural changes of selected samples after a desired number

TABLE 1

List of electrode samples, compositions, and preparation conditions.

| Sample No. | Web of Conductive Filaments | Electro-active Particles | Binder Material & Treatments |
|---|---|---|---|
| 1 | Carbonized polyimide nano-wires, Sample c-PI-wire | Sn nano particles | Phenolic resin, carbonized |
| Control-1 | 10% by wt. carbon black (Super-P) + 7% PVDF binder | Sn nano particles | PVDF |
| 2 | Carbonized PAN nano-wires, Sample c-PAN-wire | Tin oxide nano particles | Phenolic resin, carbonized |
| Control-2A | Carbonized PAN nano-wires, Sample c-PAN-wire | Tin oxide nano particles | Phenolic resin, no carbonization |
| Control-2B | 10% by wt. carbon black (Super-P) + 7% PVDF binder | Tin oxide nano particles | PVDF |
| 3 | Mixture of carbonized PAN nanowires and CNFs, c-PAN-wire/CNF | Si nano particles | Sulfonated Polyaniline |
| 4 | Carbonized, electro-spun PAN nano-fibers, Sample c-PAN-0-B | Si nano particles | Phenolic resin, carbonized |
| Control-4 | 10% by wt. carbon black (Super-P) + 7% PVDF binder | Si nano particles | PVDF |
| 5 | Tin (Sn) nano-wires | Sn nano particles | Poly(furfuryl alcohol), carbonized |
| Control-5 | 10% by wt. Carbon black (Super-P) + 7% PVDF binder | Sn nano particles | PVDF |
| 6 | Carbonized, electro-spun PAN nano-fibers, Sample c-PAN-0-B | $LiCoO_2$ | Phenolic resin, carbonized |
| Control-6 | 10% by wt. Carbon black (Super-P) + 7% PVDF binder | $LiCoO_2$ | PVDF |
| 7 | Web of NGPs with high length-to-width ratios, Sample NGP-100 | $Li_{1+x}Mn_yFe_zPO_4$ | Poly(furfuryl alcohol), carbonized |
| Control 7 | 10% by wt. Carbon black (Super-P) + 10% PVDF binder | $Li_{1+x}Mn_yFe_zPO_4$ | PVDF |
| 8 | Mixture of NGPs and vapor-grown CNFs, Sample NGP-CNF-20 | $LiMn_2O_4$ | Poly(furfuryl alcohol), carbonized |
| Control-8 | 10% by wt. Carbon black (Super-P) + 7% PVDF binder | $LiMn_2O_4$ | PVDF |
| 9 | Vapor-grown CNFs | Nanoparticle $\gamma$-$LiV_2O_5$ | Poly(furfuryl alcohol), carbonized |
| Control-9B | Vapor-grown CNFs | Micron particle (diameter 3.5 μm) $\gamma$-$LiV_2O_5$ | Poly(furfuryl alcohol), carbonized |
| 10 | NGPs with a length-to-width ratio >3 that form an integral web to support Si nano particles | Sn nano particles | Phenolic resin, carbonized |
| Control-10 | Aggregate of NGPs with length-to-width ratios ~1, used as conductive additives | Sn nano particles | Phenolic resin, carbonized | of repeated charging and recharging cycles were observed using both transmission electron microscopy (TEM) and scanning electron microscopy (SEM).

Figure 7:
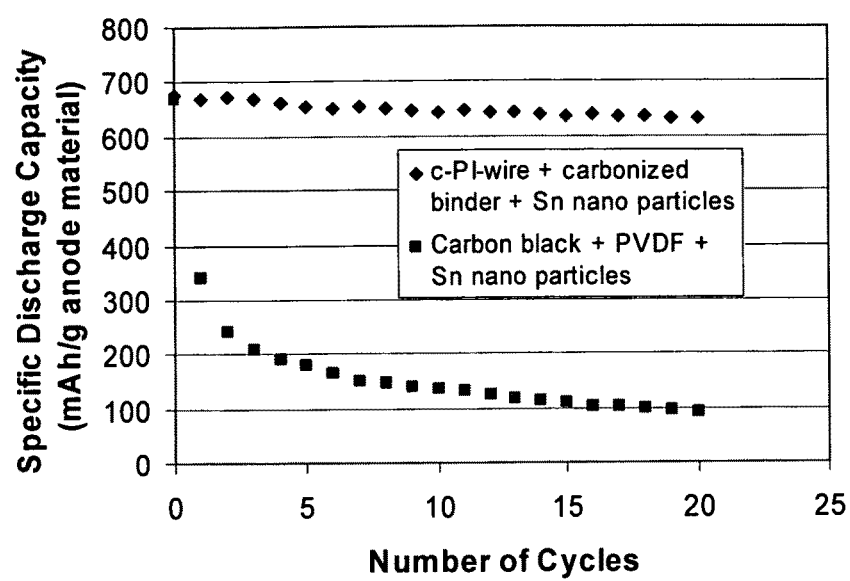
FIG. 7 Specific discharge capacities of Sample 1 (Sn particles/c-PI-wire web/carbonized phenolic resin binder) and those of Sample Control-1 (Sn particles bonded by PVDF with carbon black as a conductive additive) plotted as a function of the number of charge and discharge cycles.

Shown in FIG. 7 are the specific discharge capacities of Sample 1 (Sn particles/c-PI-wire/carbonized phenolic resin binder) and those of Sample Control-1 (Sn particles bonded by PVDF with carbon black as a conductive additive) plotted as a function of the number of charge and discharge cycles. It is clear that PVDF-bonded Sn nano particles and carbon black particles, although providing a good initial capacity, do not exhibit a good cycling response. The discharge capacity rapidly decayed as cycling proceeded. SEM examination of the sample after 20 cycles showed that a significant number of Sn particles broke away from carbon black particles and many carbon black particles were separated from one another. This implies that a significant proportion of the electro-active material (Sn nano particles) lost its electric contact with the current collector likely due to repeated Sn particle expansion/shrinkage-induced stresses or strains. In sharp contrast, the web of carbonized PI nano-wires provides a stable supporting substrate for the Sn nano particles that are bonded onto nanowires via a carbonized resin binder. The web appears capable of maintaining its structural integrity and the 3D network of electron-conductive paths that it affords for an extended cycle life. The differences between the specific capacities of the presently invented anodes and those of the prior art anodes are huge, further demonstrating the novelty and non-obviousness of the present invention.

Figure 8:
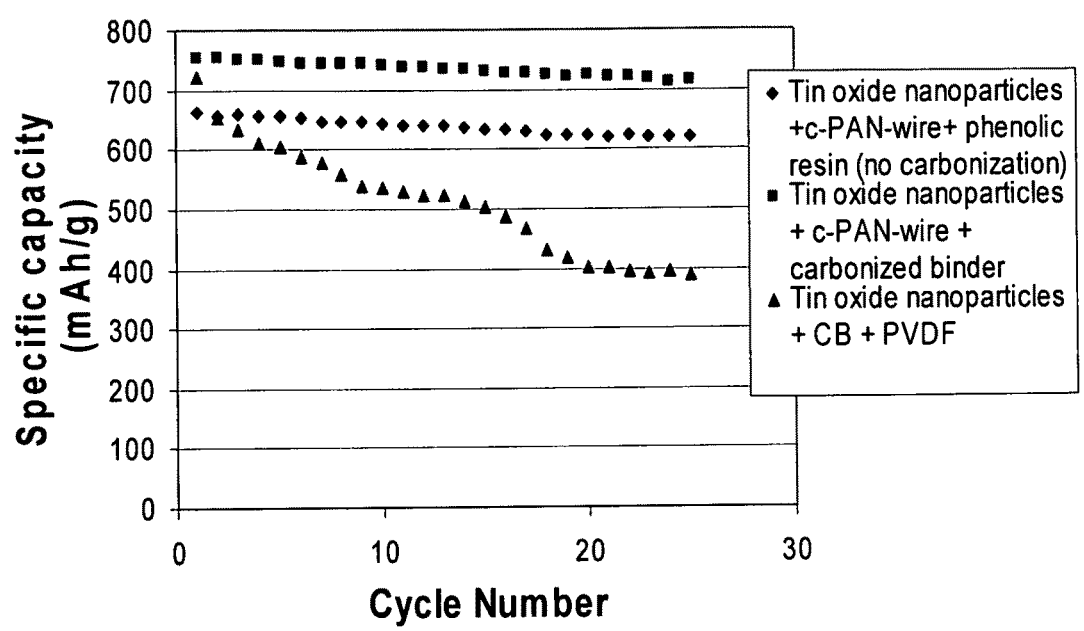
FIG. 8 Specific capacities of Sample 2 (tin oxide nanoparticles+web of carbonized PAN nano-wires+carbonized resin binder), Sample Control-2A (tin oxide nanoparticles+web of carbonized PAN nano-wires+non-carbonized phenolic resin binder), and Sample Control-2B (tin oxide nano particles+carbon black+PVDF binder).

FIG. 8 shows the specific capacities of Sample 2 (tin oxide nanoparticles+web of carbonized PAN nano-wires+carbonized resin binder), Sample Control-2A (tin oxide nanoparticles+web of carbonized PAN nano-wires+non-carbonized phenolic resin binder), and Sample Control-2B (tin oxide nano particles+carbon black+PVDF binder) plotted as a function of the number of charge and discharge cycles. The results show that both anodes that contain a web of conductive nanowires show a stable cyclic behavior: the decay in specific capacity remains insignificant after 25 cycles. However, the anode featuring nano particles bonded by a carbonized resin binder (with a much higher electrical conductivity) exhibits a significantly higher specific capacity. Although the reasons for this difference remain unclear, we speculate that, in Sample Control-2A, some of the tin oxide nano particles were in direct contact with the conductive nanowires, but other particles were electronically separated by the non-carbonized phenolic resin (non-conductive). Hence, some of the tin oxide nano particles were not effective in contributing to the provision of charges. Further by contrast, Sample Control-2B, based on the conventional anode technology (with carbon black serving as a conductive additive and PVDF as a binder), exhibits the worse cyclic response.

Figure 9:
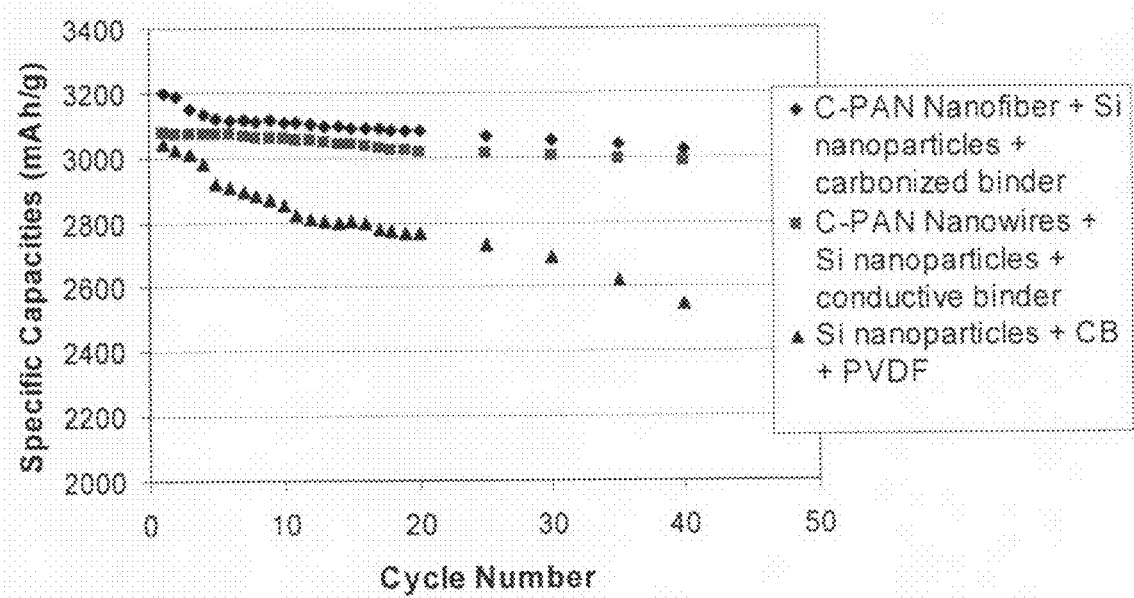
FIG. 9 Specific capacities of Sample 4 (Si nanoparticles bonded to a web of carbonized electro-spun PAN nano-fibers with a carbonized resin binder, Sample 3 (a web of mixed carbonized PAN nanowires and CNFs, Si nanoparticles bonded to the nano-wires or nano fibers via a conductive polymer binder), and Sample Control-4 (Si nano particles mixed with carbon black particles via PVDF binder)

FIG. 9 shows the results of a study on specific capacities of Sample 4 (Si nanoparticles bonded to a web of carbonized electro-spun PAN nano-fibers with a carbonized resin binder, Sample 3 (a web of mixed carbonized PAN nanowires and CNFs, Si nanoparticles bonded to the nano-wires or nano fibers via a conductive polymer binder), and Sample Control-4 (Si nano particles mixed with carbon black particles via PVDF binder). The specific capacities were plotted as a function of the number of charge and discharge cycles. It is of significance to note that simple bonding of Si nano particles to a web of conductive nano filaments was effective in producing an anode material that exhibits a reversible specific capacity as high as 2,987-3,200 mAh/g (based on per unit gram of the Si/filament/binder material). This is as high as 7-8 times the theoretical capacity of a graphite anode material. No chemical vapor deposition (CVD) of a thin Si coating concentric with respect to the nano filament is required. CVD can be slow and expensive. Simple mixing of webs with a nano-particle-resin mixture can be a continuous and fast process and is amenable to mass production of high-capacity anode materials. This is a highly surprising and useful result. Again, a sample based on conventional carbon black and resin binder approach exhibits a poor cycling behavior.

It may be noted that the electrochemical responses of the presently invented nano particle bonded material-based anodes are superior to those of amorphous, thin Si films (directly deposited on a current collector) in terms of both a high reversible specific capacity and long cycle life, as reported in [Refs. 44-47]. Our anode materials perform the best in terms of reversible specific capacity, with only one exception [Ref. 47], in which Jung, et al. reported a high discharge capacity of approximately 4,000 mAh/g in one particular case. However, the capacity drops precipitously after 15 cycles in this case.

Figure 10:
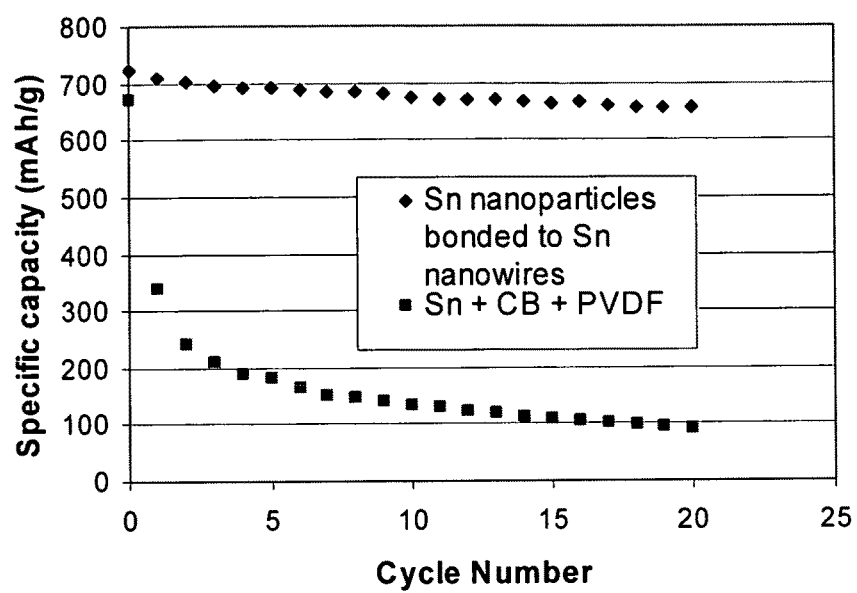
FIG. 10 Specific capacities of anode materials based on tin (Sn) nanoparticles (bonded by PVDF) and a blend of Sn nano-wires (in a web form) and Sn nanoparticles (bonded to nanowires via a carbonized binder).

Another highly surprising result of the present study is related to anode materials based on tin (Sn) nanoparticles (bonded by PVDF) and a blend of Sn nano-wires (in a web form) and Sn nanoparticles (bonded to nanowires via a carbonized binder). These are Sample Control-5 and Sample 5, respectively, in Table 1. It may be noted that Sample 5 provides an example for the cases where the conductive filaments and the electro-active particles are of substantially identical chemical composition. The charge-discharge cycling results are summarized in FIG. 10. Clearly, the Sn nanowire web-based electrode provides not only an exceptionally high specific capacity, but a stable cyclic response with a very small decay rate. In contrast, the electrode based on Sn nano particles and carbon black bonded by PVDF rapidly loses its charge storage capacity as charging and discharging operations are repeated. Since the electrical conductivity of tin can be as high as $9.1 \times 10^4$ S/cm, those who are skilled in the art would expect that, with some help from carbon black particles and a binder, the Sn nano particles should be capable of maintaining good structural integrity and continuity of electron-conducting paths during the cycling operation. On the contrary, many of the Sn nano particles quickly became ineffective in providing collectable electrons. Quite surprisingly, by adding a small amount of Sn nano wires in the form of a web (approximately 20%), the Si nano particles exhibit an impressive cycling response with a high reversible specific capacity.

Figure 11:
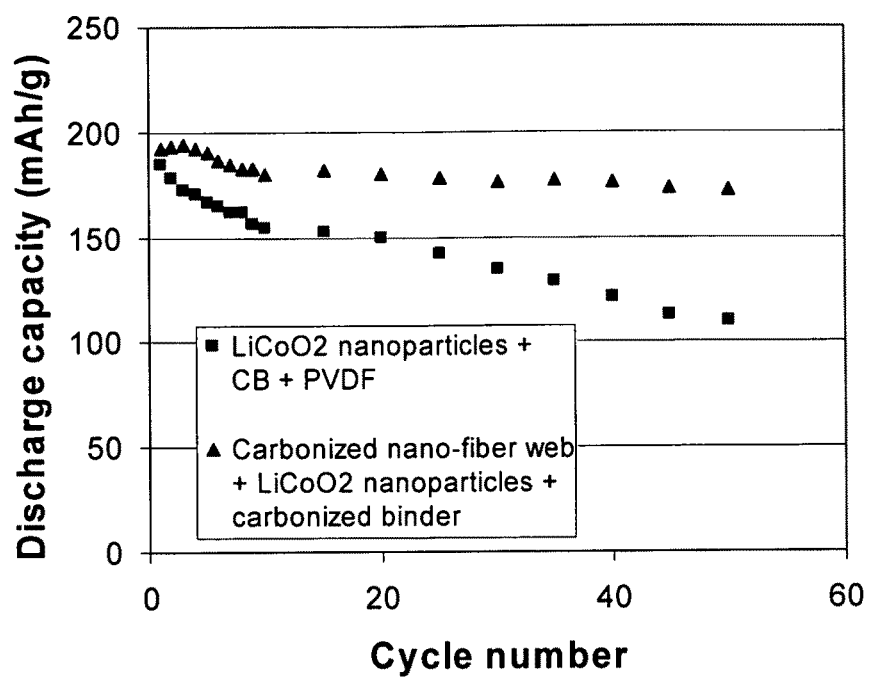
FIG. 11 Specific capacities of lithium cobalt oxide nano particle-conductive web-carbonized binder sample (Sample 6) and its control sample (Sample Control-6), which was based on lithium cobalt oxide particles and carbon black bonded by PVDF.

FIG. 11 shows the results of a study on specific capacities of lithium cobalt oxide nano particle-conductive web-carbonized binder sample (Sample 6) and its control sample (Sample Control-6), which was based on lithium cobalt oxide particles and carbon black bonded by PVDF. In each curve, the specific capacity was plotted as a function of the number of discharge cycles. It is of significance to note that the $LiCoO_2$ nanoparticles (when bonded to a conductive web with a conductive binder) provide an effective cathode active material that exhibits a reversible specific capacity as high as 185-205 mAh/g (based on per unit gram of the hybrid material). Very little capacity fading was observed for the cathode material based on conductive filament web-bonded nanoparticles. In contrast, fine particle-based cathode active material (with conventional conductive additive and binder materials) shows a continuous decay in capacity after the first cycle.

Figure 12:
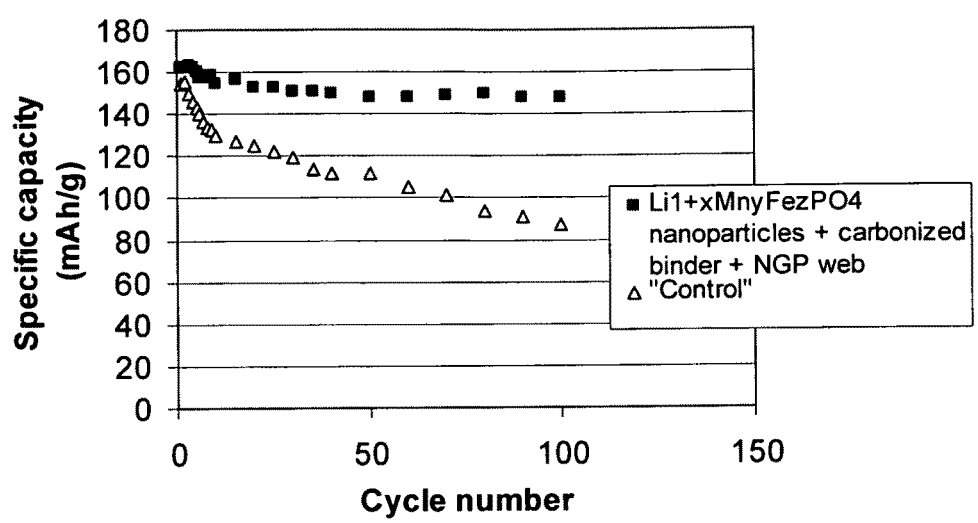
FIG. 12 The discharge specific capacities of Sample 7 (NGP web+Li$_{1+x}$Mn$_y$Fe$_z$PO$_4$ nanoparticles+carbonized resin binder) and a control sample.

The discharge specific capacities of Sample 7 (NGP web+$Li_{1+x}Mn_yFe_zPO_4$ nanoparticles+carbonized resin binder) are shown in FIG. 12. The specific capacities of a control sample, based on fine particles bonded by 10% binder and 10% carbon black, are also included in the diagram for the purpose of comparison. Clearly, the presently invented electrode materials are better than the state-of-the-art nanoparticle-based cathode in light of both a high reversible specific capacity and a long cycle life.

Figure 13:
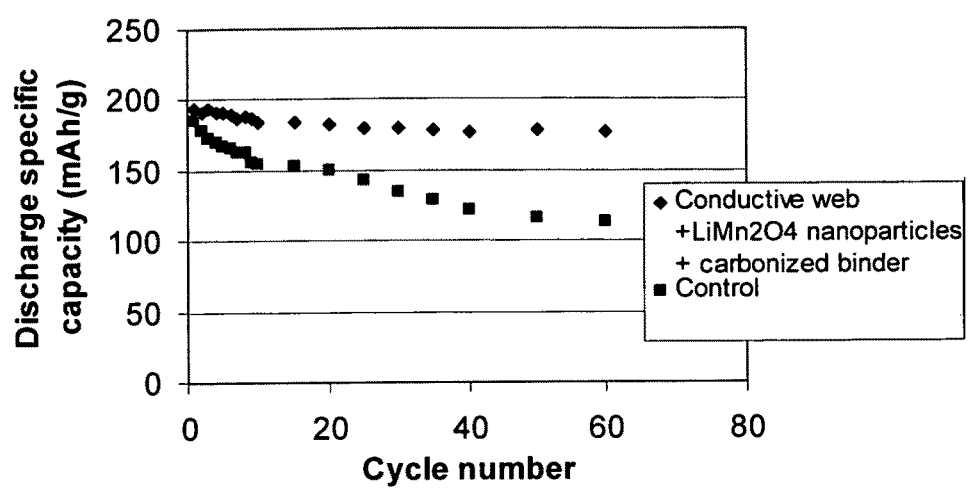
FIG. 13 The discharge specific capacities of Sample 8 (a NGP/CNF web+LiMn$_2$O$_4$ nanoparticles+carbonized binder) and a control sample.

FIG. 13 shows discharge specific capacities of Sample 8 (a NGP/CNF web+LiMn$_2$O$_4$ nanoparticles+carbonized binder) also plotted as a function of the number of discharge cycles. The cycling test was conducted between 1.5 V and 3.5 V (with a Li foil as a counter electrode) at a current density of 0.02 mA/cm$^2$. The specific capacity of a control sample comprising LiMn$_2$O$_4$ particles bonded by 7% PVDF and 10% carbon black was also plotted for comparison. It is clear that the hybrid web/nanoparticle/conductive binder-based electrode exhibits a superior cycling behavior.

Figure 14:
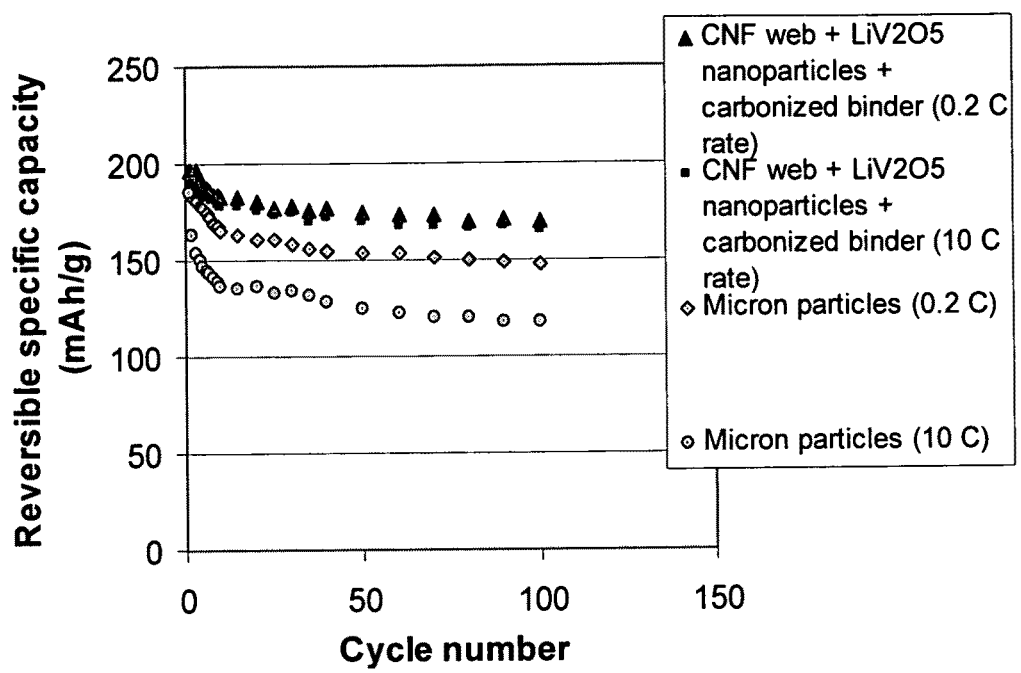
FIG. 14 Specific capacities of Sample 9 (CNF web+γ-LiV$_2$O$_5$ nanoparticles+carbonized binder) and Sample Control 9B (CNF web+vanadium oxide micron particles+carbonized binder).

FIG. 14 shows the specific capacities of Sample 9 (CNF web+γ-LiV$_2$O$_5$ nanoparticles+carbonized binder) and Sample Control 9B (CNF web+vanadium oxide micron particles+carbonized binder). The charging cycle was conducted to reach a maximum capacity of 230 mAh/g and the discharge was conducted at rates of C/5 and 10C for both samples. It is clear that the presently invented electrode material performs exceptionally well even under a high discharge rate condition. This impressive outcome may be explained as follows: The power density of a lithium ion battery is dictated, at the fundamental science level, by the electrochemical kinetics of charge transfer at the electrode/electrolyte interface and the kinetics of solid-state diffusion of lithium ions into and out of the host electrode active material. Thus, the rate capacity of a battery electrode is highly dependent on the electrode active material particle size. Since the diameter of elongated γ-LiV$_2$O$_5$ nanoparticles in the present invention is of nanometer scale, the diffusion path is short and the diffusion of Li ions is fast, enabling a good high-rate discharge response. For the corresponding control sample featuring micron-scale spherical particles with an average diameter of 3.5 μm, the cyclic response at a low discharge rate is relatively good likely due to the web that provides a stable 3D network of electron transport paths. However, at a higher discharge rate (10 C), the process became diffusion-limited; i.e., some Li ions would not have enough time to diffuse out of the micron particles during such a short period of time.

The specific capacities of Sample 10 (web of NGPs with a high length-to-width ratio of >3, +Sn nanoparticles+carbonized binder) and Sample Control 10A (aggregates of conventional NGPs with a length-to-width ratio<1.5, +Sn nanoparticles+carbonized binder) were also investigated. In the latter anode material, NGPs were used mainly as a conductive additive and were mixed with Sn particles and phenolic resin powder to form a mixture in a passive manner. The NGPs were not deliberately designed and processed to form a 3D web of intersecting filaments.

By contrast, the NGPs with a high length-to-width ratio were chosen in Sample 10 to facilitate the formation of a 3D web for supporting the Sn nano particles. A paper-making process as depicted in FIG. 6 was used to prepare a sheet of NGP/binder mat, which was then rigidized by curing the binder resin. This rigidized (hence, structurally strong) web of NGPs, having interconnected macro pores, was then impregnated with a precursor SnCl$_2$ solution. The mixture was heated in a flask under nitrogen environment at 370° C. for approximately 10 hours. The product was rinsed in distilled water for one minute and then dried in ambient air for one hour. The dried product was post-heated at 1,000° C. for one hour, resulting in a product that is composed of Sn nanoparticles disposed in pores of the NGP web. This product was dipped in a diluted phenolic resin-acetone solution for 30 seconds, removed from the solution, dried in a chemical fume hood, and heated at 200° C. to cure the resin. Carbonization of this binder resin was conducted at 500° C. for one hour and 1000° C. for another hour.

Figure 15:
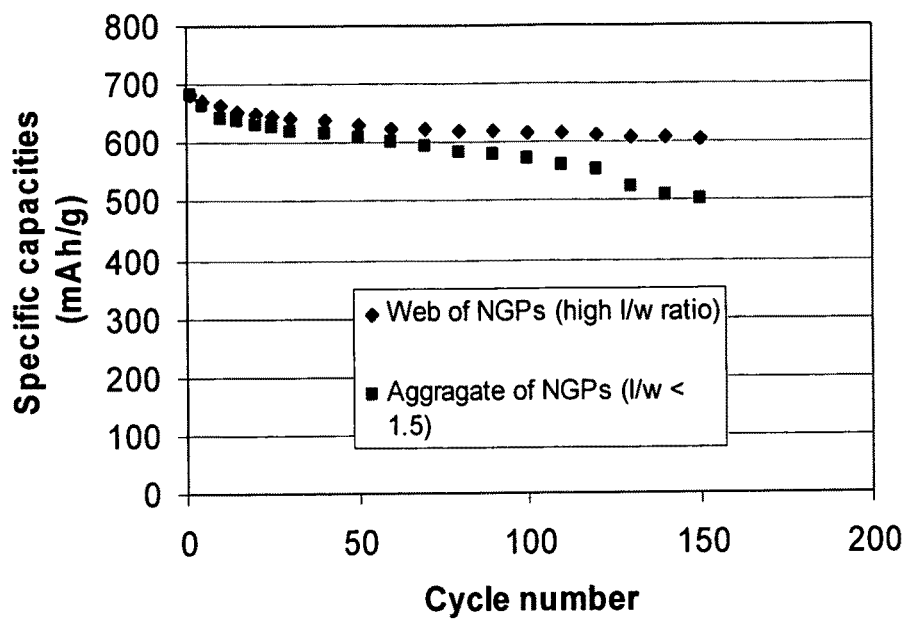
FIG. 15 The specific capacities of Sample 10 (web of NGPs with a high length-to-width ratio+Sn nanoparticles+carbonized binder) and Sample Control 10A (aggregates of conventional NGPs with a length-to-width ratio<1.5, +Sn nanoparticles+carbonized binder).

FIG. 15 shows the specific capacities of Sample 10 and Sample Control-10, which clearly demonstrates the advantages of establishing an integral web of conductive NGP filaments prior to bonding electro-active particles onto NGPs using a conductive or carbonized resin binder. This web serves to maintain continuity of electron transport paths for a much longer cycle life.

In summary, the present invention provides an innovative, versatile platform materials technology that enables the design and manufacture of superior cathode and anode materials for lithium metal or lithium ion batteries. This new technology has the following primary advantages:

(1) The approach of using highly conductive, nano-scaled filaments (e.g., carbon nano-fibers and nanowires with a diameter<500 nm)) to support a cathode or an anode active material in a nanometer powder form (with a conductive binder) proves to be a superior strategy, which is applicable to a wide range of electro-active materials that have a high Li-absorbing capacity. The geometry of the underlying filament enables the supported (bonded) particles to freely undergo strain relaxation when the particles are swollen with incoming lithium. The nano particles maintain a good contact with the underlying substrate filament web upon repeated charge/discharge cycling. This has proven to be a surprisingly robust configuration.

(2) With the active material particle size less than 1 μm (thinner than 100 nm in many cases), the distance that lithium ions have to travel is short. The cathode and/or anode can quickly store or release lithium and thus can be recharged at a fast rate and discharged at a high rate (e.g., during automobile acceleration). This is a highly beneficial feature for a battery that is intended for high power density applications such as electric cars.

(3) The interconnected network of filaments forms a continuous path for electron transport, resulting in significantly reduced internal energy loss or internal heating. This network is electronically connected to a current collector and, hence, all filaments are essentially connected to the current collector.

(4) In the instant invention, the conductive binder (particularly the carbonized resin) was surprisingly capable of holding on the nano particles during their expansion/shrinkage operations. Considering the fact that this binder material is typically very distinct from the electro-active material particles in terms of thermo-elastic constants (e.g., modulus of elasticity, Poisson ratio, shear modulus, and coefficient of thermal expansion), it was indeed highly surprising to observe that the nano particles did not de-wet (get detached) from the binder material or from the underlying nano-filaments. This is an unexpected result even to those skilled in the art. For those samples that have been subjected to a large number of repeated charging and discharging cycles (e.g., 500 cycles), no significant de-wetting or detaching was observed.

(5) A wide range of fast and inexpensive processes can be scaled-up for mass production of the conductive webs.

(6) The electrode material in the present invention provides an exceptionally high reversible specific capacity. Even when the weights of the filament web and the binder are both accounted for, the maximum capacity can still be exceptionally high since the underlying filament and binder normally occupy only a very small weight fraction of the total hybrid nano material. Furthermore, the Li ion batteries featuring the presently invented nano composite electrode material exhibit superior multiple-cycle behaviors with only a small capacity fade and a long cycle life.

(7) The co-carbonization of the nanowires/nano-fibers and the binder resin surprisingly provides a convenient and cost-effective way of producing nanocomposite lithium battery electrodes with an exceptionally high specific capacity and an outstanding cycle life.

(8) The presently invented process allows for convenient preparation of an integrated electrode-current collector structure.

The invention claimed is:

1. A nanocomposite-based lithium battery electrode comprising:
   (a) an electrically conductive web consisting of nano-scaled graphene platelets that are interconnected, intersected, physically contacted, or chemically bonded to form a three-dimensional network of electron-conducting paths, wherein said platelets have a length and a width and the ratio of the length to width is greater than 3;
   (b) sub-micron or nanometer-scale electro-active particles; and
   (c) an electrically conductive binder material wherein the electro-active particles are bonded to a surface of said nano-scaled graphene platelets with the electrically conductive binder material, wherein said electro-active particles comprise an electro-active material capable of absorbing and desorbing lithium ions and wherein the electro-active material content is no less than 20% by weight based on the total weight of the electro-active particles, the binder material, and the nano-scaled graphene platelets; wherein said electrically conductive binder material is selected from an electrically conductive polymer, a polymeric carbon, a metal or metal alloy, or a combination thereof and the electrically conductive polymer is obtained from carbonization of poly(acrylonitrile), poly(furfuryl alcohol), poly(amic acid), polyimide, phenolic resin, or a combination thereof.

2. The electrode of claim 1 wherein said electro-active particles have a diameter smaller than 500 nm, and wherein said electro-active particles are pre-fabricated into a fine solid powder form prior to being bonded to said nano-scaled graphene platelets.

3. The electrode of claim 1 wherein said electro-active particles have a diameter smaller than 100 nm.

4. The electrode of claim 1 wherein said electrically conductive binder material is a an electrically conductive polymer obtained from carbonization of poly(acrylonitrile), poly(furfuryl alcohol), poly(amic acid), polyimide, phenolic resin, or a combination thereof.

5. The electrode of claim 1 wherein said electro-active particles are coated with a thin layer of carbon having a thickness less than 1 μm.

6. The electrode of claim 4 wherein said electro-active particles are coated with a thin layer of carbon having a thickness less than 1 μm.

7. The electrode of claim 6 wherein said thin layer of carbon is obtained from pyrolization of a polymer, chemical vapor deposition, or pyrolyzation of an organic precursor.

8. The electrode of claim 1 further comprising an additional amount of nano-scaled graphene platelets that have a length-to-width ratio less than 3.

9. The electrode of claim 1 wherein the electro-active material comprises an anode active material selected from the group consisting of:
   (a) silicon (Si), germanium (Ge), tin (Sn), lead (Pb), antimony (Sb), bismuth (Bi), zinc (Zn), aluminum (Al), and cadmium (Cd);
   (b) alloys or intermetallic compounds of Si, Ge, Sn, Pb, Sb, Bi, Zn, Al, or Cd with other elements, wherein said alloys or compounds are stoichiometric or non-stoichiometric;
   (c) oxides, carbides, nitrides, sulfides, phosphides, selenides, and tellurides of Si, Ge, Sn, Pb, Sb, Bi, Zn, Al, Fe, or Cd, and their mixtures or composites; and
   (d) combinations thereof.

10. The electrode of claim 2 wherein the electro-active material comprises an anode active material selected from the group consisting of:
    (a) silicon (Si), germanium (Ge), tin (Sn), lead (Pb), antimony (Sb), bismuth (Bi), zinc (Zn), aluminum (Al), and cadmium (Cd);
    (b) alloys or intermetallic compounds of Si, Ge, Sn, Pb, Sb, Bi, Zn, Al, or Cd with other elements, wherein said alloys or compounds are stoichiometric or non-stoichiometric;
    (c) oxides, carbides, nitrides, sulfides, phosphides, selenides, and tellurides of Si, Ge, Sn, Pb, Sb, Bi, Zn, Al, Fe, or Cd, and their mixtures or composites; and
    (d) combinations thereof.

11. The electrode of claim 6 wherein the electro-active material comprises an anode active material selected from the group consisting of:
    (a) silicon (Si), germanium (Ge), tin (Sn), lead (Pb), antimony (Sb), bismuth (Bi), zinc (Zn), aluminum (Al), and cadmium (Cd);
    (b) alloys or intermetallic compounds of Si, Ge, Sn, Pb, Sb, Bi, Zn, Al, or Cd with other elements, wherein said alloys or compounds are stoichiometric or non-stoichiometric;
    (c) oxides, carbides, nitrides, sulfides, phosphides, selenides, and tellurides of Si, Ge, Sn, Pb, Sb, Bi, Zn, Al, Fe, or Cd, and their mixtures or composites; and
    (d) combinations thereof.

12. The electrode of claim 1 wherein the electro-active material comprises a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, and combinations thereof.

13. A nanocomposite-based lithium battery electrode comprising:
    (a) a porous web consisting of electrically conductive nano-scaled graphene platelets that are interconnected, intersected, physically contacted, or chemically bonded to form a three-dimensional network of electron-conducting paths, wherein said platelets have a length and a width and the ratio of the length to width is greater than 3;
    (b) sub-micron or nanometer-scale electro-active particles not produced by a chemical vapor deposition process; and
    (c) an electrically conductive binder material, wherein the electro-active particles are bonded to a surface of said nano-scaled graphene platelets with the electrically conductive binder material through a bonding step, wherein said electro-active particles are pre-fabricated into a solid powder form prior to the preparation of said battery electrode and independent of the bonding step, and said electro-active particles are capable of absorbing and desorbing lithium ions and wherein the electro-active particles are no less than 20% by weight based on the total weight of the electro-active particles, the electrically conductive binder material, and the nano-scaled graphene platelets, wherein said electrically conductive binder material is selected from an electrically conductive polymer, a polymeric carbon, a metal or metal alloy, or a combination thereof and the electrically conductive polymer is obtained from carbonization of poly(acrylonitrile), poly(furfuryl alcohol), poly(amic acid), polyimide, phenolic resin, or a combination thereof.

14. The electrode of claim 6 wherein the electro-active material comprises a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, and combinations thereof.

15. The electrode of claim 1 wherein the electro-active material content is no less than 50% by weight based on the total weight of the electro-active particles, the electrically conductive binder material, and the nano-scaled graphene platelets.

16. The electrode of claim 1 wherein the electro-active material content is no less than 70% by weight based on the total weight of the electro-active particles, the binder material, and the nano-scaled graphene platelets.

17. The electrode of claim 1 wherein the electro-active material and the nano-scaled graphene platelets are of identical chemical composition and the electro-active material is selected from the group consisting of:
(a) silicon (Si), germanium (Ge), tin (Sn), lead (Pb), antimony (Sb), bismuth (Bi), zinc (Zn), aluminum (Al), and cadmium (Cd);
(b) alloys or intermetallic compounds of Si, Ge, Sn, Pb, Sb, Bi, Zn, Al, or Cd with other elements, wherein said alloys or compounds are stoichiometric or non-stoichiometric;
(c) oxides, carbides, nitrides, sulfides, phosphides, selenides, and tellurides of Si, Ge, Sn, Pb, Sb, Bi, Zn, Al, Fe, or Cd, and their mixtures or composites; and
(d) combinations thereof.

18. The electrode of claim 13 wherein the electro-active material comprises a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, and combinations thereof.

* * * * *